United States Patent
Packebush et al.

(10) Patent No.: US 7,203,701 B1
(45) Date of Patent: Apr. 10, 2007

(54) SYSTEM AND METHOD FOR AN INTERFACE TO PROVIDE VISUALIZATION AND NAVIGATION OF A DIRECTED GRAPH

(75) Inventors: Sherrill J. Packebush, Austin, TX (US); Marie Y. Hwang, Austin, TX (US); Brian M. McDonald, Austin, TX (US); Marian Steinbach, Köln (DE)

(73) Assignee: Trilogy Development Group, Inc., Austin, TX (US)

( * ) Notice: Subject to any disclaimer, the term of this patent is extended or adjusted under 35 U.S.C. 154(b) by 544 days.

(21) Appl. No.: 10/079,349

(22) Filed: Feb. 20, 2002

(51) Int. Cl.
*G06F 17/00* (2006.01)

(52) U.S. Cl. .................. 707/103 Y; 715/853; 715/713; 707/102

(58) Field of Classification Search ........ 707/101–102, 707/103 Y; 715/853–854, 734–739, 713, 715/802, 968–969
See application file for complete search history.

(56) References Cited

U.S. PATENT DOCUMENTS

| | | | | |
|---|---|---|---|---|
| 5,414,809 A * | 5/1995 | Hogan et al. | ................ | 715/765 |
| 5,812,135 A * | 9/1998 | Kotchey | ....................... | 715/853 |
| 6,073,137 A | 6/2000 | Brown et al. | ............ | 707/104.1 |
| 6,166,739 A * | 12/2000 | Hugh | .......................... | 715/854 |
| 6,300,957 B1* | 10/2001 | Rao et al. | .................... | 345/441 |
| 6,496,842 B1* | 12/2002 | Lyness | ....................... | 715/514 |
| 6,628,304 B2* | 9/2003 | Mitchell et al. | ............ | 715/734 |
| 6,901,555 B2* | 5/2005 | Hida et al. | .................... | 715/734 |
| 2002/0049740 A1* | 4/2002 | Arning et al. | ................. | 707/1 |
| 2003/0056199 A1* | 3/2003 | Li et al. | ...................... | 717/127 |

OTHER PUBLICATIONS

Furnas et al., "Multitrees: Enriching and Resuing Hierarchical Structure", Apr. 1994, ACM, pp. 330-336.*
Graham et al., "A Comparison of Set-Based and Graph-Based Visualization of Overlapping Classification Hierarchies", Feb. 2000, ACM, pp. 41-50.*
Furnas, George W., Zacks, Jeff; "Multitrees: Enriching and Reusing Hierarchical Structure," *Proceedings of the ACM CHI'94 Conference on Human Factors in Computing Systems*, pp. 330-336, 1994. (Copy enclosed.)

* cited by examiner

*Primary Examiner*—Saythyanarayan Pannala
(74) *Attorney, Agent, or Firm*—Hamilton & Terrile, LLP; Kent B. Chambers

(57) ABSTRACT

A method and system for providing an interface that allows navigation and display of a directed graph are provided. The interface provides visualization of an underlying graph structure comprising a plurality of hierarchies with shared common nodes, wherein the hierarchies do not necessarily share the exhaustive child-tree of the common node. The method provides for the interface to display a focus node, parent nodes (if any) of the focus node, and in-context children (if any) of the focus node. In a preferred embodiment, the displays of focus, parent, and in-context child nodes are textual displays rather than graphical node-link displays.

32 Claims, 31 Drawing Sheets

| GROUPING "ORGANIZATION STRUCTURE" | | | | ☒ |
|---|---|---|---|---|
| ☐ ☐ ☐ ☐ | | | | |

| DETAILS | CONTENT BROWSING | ╱─1602 | | |
|---|---|---|---|---|

| IN FOCUS: ROOT2 ╱─502 | OPEN | ADD CHILDREN... | MOVE... | FIND... |
|---|---|---|---|---|

PARENTS OF "ROOT2"

| NAME ▽ | HIERARCHY | START DATE | END DATE | △ |
|---|---|---|---|---|
| (TOP OF GROUPING) | | | | |
| | | | | ▽ |

SHOWING LINE 1 TO 1 OF 1

| BRING TO FOCUS | CHANGE END DATE... | ╱─1604 |
|---|---|---|

CHILDREN OF "ROOT2" >>"TOP OF GROUPING"

| NAME ▽ | HIERARCHY | START DATE | END DATE | △ |
|---|---|---|---|---|
| NODE1 ─406 | FAMILY A ─500 | 01/01/2000 | INFINITE | |
| NODE2 ─404 | FAMILY A ─500 | 01/01/1999 | 12/31/2003 | ▽ |

SHOWING LINE 1 TO 2 OF 2

| BRING TO FOCUS | CHANGE END DATE... | ╲─1606 |
|---|---|---|

GROUPING "ORGANIZATION STRUCTURE"

| DETAILS | CONTENT BROWSING | 1602 |

IN FOCUS: NODE1 — 406    [OPEN] [ADD CHILDREN...] [MOVE...] [FIND...]

| NAME ▽ | HIERARCHY | START DATE | END DATE |
|---|---|---|---|
| ROOT1 — 402 | ORGANIZATION A — 400 | 01/01/2000 | INFINITE |
| ROOT2 — 502 | FAMILY A — 500 | 01/01/1999 | 12/31/2003 |

SHOWING LINE 1 TO 3 OF 3

[BRING TO FOCUS] [CHANGE END DATE...] — 1604

CHILDREN OF "ROOT2" >> "NODE1" — 500    400

| NAME ▽ | HIERARCHY | START DATE | END DATE |
|---|---|---|---|
| CHILD2D — 506 | FAMILY A;ORGANIZATION A | 01/01/2000 | INFINITE |
| CHILD1B — 508 | FAMILY A — 500 | 01/01/1999 | 12/31/2003 |
| CHILD1C — 510 | FAMILY A — 500 | 08/01/1999 | INFINITE |

SHOWING LINE 1 TO 3 OF 3

[BRING TO FOCUS] [CHANGE END DATE...] — 1606

GROUPING "ORGANIZATION STRUCTURE"

☐☐☐☐☐ FIND

| DETAILS | CONTENT BROWSING |
|---|---|

— 1902

IN FOCUS: (TOP OF GROUPING) [OPEN] [ADD CHILDREN...] [MOVE...] [FIND...]

CHILDREN OF "TOP OF GROUPING"

| NAME | HIERARCHY | START DATE | END DATE |
|---|---|---|---|
| ROOT1 | ORGANIZATION A | 01/01/2000 | INFINITE |
| ROOT2 | FAMILY A | 01/01/1999 | 12/31/2003 |
| ROOT3 | ORGANIZATION B | 08/01/1999 | INFINITE |

SHOWING LINE 1 TO 3 OF 3

[BRING TO FOCUS] [CHANGE END DATE...]
1502

GROUPING "ORGANIZATION STRUCTURE"

FIND GROUPING "ORGANIZATION STRUCTURE" —2008      —2004

[NAME ▽]  [CONTAINS ▽]  [SIMPSON]         2002
2006    2010 [APPLY]  [RESET]  —2016

| NAME ▽ | ID |
|---|---|
| ABE SIMPSON | 48181112 |
| BART SIMPSON | 11036599 |
| HOMER SIMPSON | 88849290 |
| LISA SIMPSON | 46380590 |
| MAGGIE SIMPSON | 33927804 |
| MARGE SIMPSON | 10384539 |

SHOWING LINE 1 TO 6 OF 6
2012  [BRING TO FOCUS]  [CANCEL]
                              —2014

SHOWING LINE 1 TO 3 OF 3

[BRING TO FOCUS] [CHANGE END DATE...]
1502

FIG. 20

GROUPING "ORGANIZATION STRUCTURE"

FIND IN GROUPING "ORGANIZATION STRUCTURE" —2008

| NAME ▽ | CONTAINS ▽ | SIMPSON | —2002 |
|---|---|---|---|
| 2006 | 2010 APPLY | RESET 2016 2004 | |

—2012

| NAME1 ▽ | ID |
|---|---|
| ABE SIMPSON | 48181112 |
| BART SIMPSON | 11036599 |
| HOMER SIMPSON | 88849290 |
| LISA SIMPSON | 46380590 |
| MAGGIE SIMPSON | 33927804 |
| MARGE SIMPSON | 10384539 |

SHOWING LINE 1 TO 6 OF 6

2010 — BRING TO FOCUS | CANCEL —2014

3 OF 3

CHILDREN OF ROOT2 >> "NODE1"

| NAME ▽ | HIERARCHY | START DATE | END DATE |
|---|---|---|---|
| CHILD2D | FAMILY A;ORGANIZATION A | 01/01/2000 | INFINITE |
| CHILD1B | FAMILY A | 01/01/1999 | 12/31/2003 |
| CHILD1C | FAMILY A | 08/01/1999 | INFINITE |

SHOWING LINE 1 TO 3 OF 3

BRING TO FOCUS | CHANGE END DATE...

| GROUPING "ORGANIZATION STRUCTURE" | | | | ☒ |
|---|---|---|---|---|
| ☐☐☐☐☐ FIND | | | | |

| DETAILS | CONTENT BROWSING | ╱—1602 |

IN FOCUS: NODE1 ╱—406     [OPEN]  [ADD CHILDREN...]  [MOVE...]  [FIND...]

| NAME ▽ | HIERARCHY | START DATE | END DATE | △ |
|---|---|---|---|---|
| ROOT1 | ORGANIZATION A | 01/01/2000 | INFINITE | |
| ROOT2 —402 —502 | FAMILY A —500 —400 | 01/01/1999 | 12/31/2003 | ▽ |

SHOWING LINE 1 TO 3 OF 3

[BRING TO FOCUS] [CHANGE END DATE...]    ╲—1604

CHILDREN OF "ROOT2" >> "NODE1"   ╱—400

| NAME ▽ | HIERARCHY | START DATE | END DATE | △ |
|---|---|---|---|---|
| CHLID2D —500 | FAMILY A;ORGANIZATION A | 01/01/2000 | INFINITE | |
| CHLID1B —506 CHLID1C —508 —510 | FAMILY A —500 FAMILY A —500 | 01/01/1999 08/01/1999 | 12/31/2003 INFINITE | ▽ |

SHOWING LINE 1 TO 3 OF 3

[BRING TO FOCUS] [CHANGE END DATE...]    ╲—1606

ADD POSITION/PERSON

1. ADD TO
- HIERARCHY: SAMPLE ORGANIZATIONAL HIERARCHY
- UNDER: MICHAEL BEAN
- START DATE
- END DATE

2. POSITION
- POSITION TYPE: <SELECT ONE>
- POSITION NAME
- POSITION DESCRIPTION

3. PERSON
- USE PLACEHOLDER: ☐ YES
- PARTY ID
- FIRST NAME: DANIEL
- LAST NAME: BEAN

[SUBMIT] [CANCEL]

Navigation: TRILOGY DMS | HOME | PARTIES | HIERARCHIES | CONTRACTS | AGREEMENTS | PAYMENTS | TOOLS | MAINT | LOGOUT

| TRILOGY DMS | HOME | PARTIES | HIERARCHIES | CONTRACTS | AGREEMENTS | PAYMENTS | TOOLS | MAINT | LOGOUT |

RETIRE POSITION

HIERARCHY    SAMPLE ORGANIZATIONAL HIERARCHY
UNDER        JACK SPRAT
RETIRE AS OF  01/16/2001

1. RETIRE PERSON AND POSITION

NAME         MICHAEL BEAN
POSITION     VP, SALES
DESCRIPTION

2. SUBORDINATES AFFECTED (ONE LEVEL DOWN ONLY)

| ID △ | NAME | TITLE | DEPT |
|---|---|---|---|
| 00012 | JANE PEAS | MANAGER | SALES |
| 00013 | JENNIFER JANE STALK | MANAGER | MARKETING |
| 00015 | OZ HEINZ | VP | MARKETING |
| 00016 | ANNETTE PEAS | MANAGER | R & D |
| 00017 | JANE STALK | MANAGER | BENEFITS |
| 00019 | GARLAND HEINZ | VP | FINANCE |

[SUBMIT] [CANCEL]

SYSTEM AND METHOD FOR AN INTERFACE TO PROVIDE VISUALIZATION AND NAVIGATION OF A DIRECTED GRAPH

PARTIAL WAIVER OF COPYRIGHT

All of the material in this patent application is subject to copyright protection under the copyright laws of the United States of America and of other countries. As of the first effective filing date of this application, this material is protected as unpublished material. However, permission to copy this material is hereby granted to the extent that the copyright owner has no objection to the facsimile reproduction by anyone of the patent documentation or the patent disclosure, including the microfiche appendix, as it appears in the United States Patent and Trademark Office patent file or records but otherwise reserves all copyright rights whatsoever.

BACKGROUND OF THE INVENTION

1. Field of the Invention

The present invention relates to the field of relational objects and navigation via a user interface of a relational object hierarchy.

2. Description of the Related Art

In computing environments, various types of data structures are used to represent hierarchical data. One such data structure is a tree, which is relatively easy to navigate but is limited in the types of hierarchies it can represent. Another such structure is a graph, which is more versatile but is more difficult to represent and navigate.

Graphical controls are used in a variety of software programs ("software") to allow a user to interact with the software and stored data by using a pointer (i.e., a mouse, touch pad, etc.) and manipulate or select a graphical control displayed on the user's display screen. The graphical control is often linked to data stored on the computer system. This method of data presentation and manipulation has proven to be an intuitive and efficient process for user interaction and modification of the underlying data. Accordingly, an interface that presents graphical control for navigation, display, and manipulation of hierarchical data is desirable.

Such an interface is useful in the context of software running locally on a users work-station. Such an interface is also desirable for system software applications that run on a network such as an intranet or the Internet. An increasingly popular feature for enterprise based system applications is to provide some subset of the application's functionality through a browser-based interface that can be used to gain access to data via the Internet, World Wide Web (the Web) portion of the Internet, intranets, extranets, or other computer network. In a network setting, the data often resides on a common server so that it can be shared with more than one user. The users' computer systems (clients) access the data residing on the server from separate computer systems connected to a computer network common to both the server computer system and the client computer systems. The client computer systems display graphical controls to the users representative of the data residing on the server computer system.

A challenge in using a browser-based interface is being able to provide web-based data displays and manipulation controls that require minimal resources on the client computer system. Interactive web-based controls that perform complex tasks have been implemented using Java applet or ActiveX technologies. These technologies require the client computer system to download considerable amounts of compiled code, requiring more processing time than many users are willing to tolerate.

Accordingly, an interface that allows display, navigation, and manipulation of hierarchical data without requiring complex graphical representations that require Java applet or ActiveX technologies would provide for relatively speedy navigation and retrieval of hierarchical information.

What is needed is a method of representing a plurality of hierarchies, wherein at least two of the hierarchies share a common node but have distinct sub-trees flowing from the common node, in a format that is relatively easy for a user to navigate and that requires as little processing time as possible.

BRIEF SUMMARY OF THE INVENTION

A method and system for providing an interface that allows navigation and display of a directed graph are provided. The system is a computer system that may be implemented in software. The interface allows a user to perform top-down and bottom-up traversal, in one-level increments, of the nodes of a graph, wherein the graph includes a plurality of hierarchies. At least one of the hierarchies shares a common node with at least one other of the hierarchies. However, the two hierarchies that share the common node do not share, at least not completely, the exhaustive sub-tree of child nodes of the common node. The interface also allows the user to locate a node of interest in the graph via a "find" function, either alone or in combination with traversal. In at least one embodiment, a focus node is selected by either double-clicking on the object in a display, or by highlighting, with a single click, the desired object and then activating a "bring to focus" object.

The focus node is displayed on the interface, as are any parent nodes of the focus node. If a parent node of the focus node has been previously selected for the focus node, the focus node has a selected "context." Any in-context child nodes for the focus node, from the next-lower level of the child sub-tree for the focus node, are also displayed on the interface. Along with the focus node, only one level of child-node(s) [at most] and one level of parent node(s) [at most] are displayed at one time. This three-level view provides for an abbreviated, more useful fisheye view of the hierarchy of interest.

In at least one embodiment, a method for navigating and displaying a plurality of relational objects is provided. The plurality of relational objects comprise a directed graph, the directed graph further comprising a plurality of hierarchies wherein a first of the plurality of hierarchies shares a common node with a second of the plurality of hierarchies, wherein the common node is the parent node for a child sub-tree, and wherein at least one of the first and second hierarchies does not include all nodes of the child sub-tree. The method includes receiving a selection input and identifying, based on the selection input, a focus node, the focus node being one of the plurality of relational objects. The method further includes displaying the focus node on a display medium. The method further includes determining whether a child node of the focus node exists, wherein the child node comprises one of the plurality of relational objects other than the focus node, the child node having a subordinate relationship with the focus node. If a child node exists, the method further comprises displaying the child node on the display medium. The method further comprises determining whether a parent node of the focus node exists, wherein the parent node comprises one of the plurality of relational objects other than the focus node and the child node, the focus node having a relationship subordinate to the parent node. If a parent object exists, the method further includes displaying on a display medium the parent node.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the method and system for providing a hierarchy interface, as defined solely by the claims, will become apparent in the non-limiting detailed description set forth below.

BRIEF REFERENCES TO THE DRAWINGS

The present invention may be better understood, and its numerous objects, features and advantages made apparent to those skilled in the art by referencing the accompanying drawings. The use of the same reference number throughout the several figures designates a like or similar element.

Figure 5:
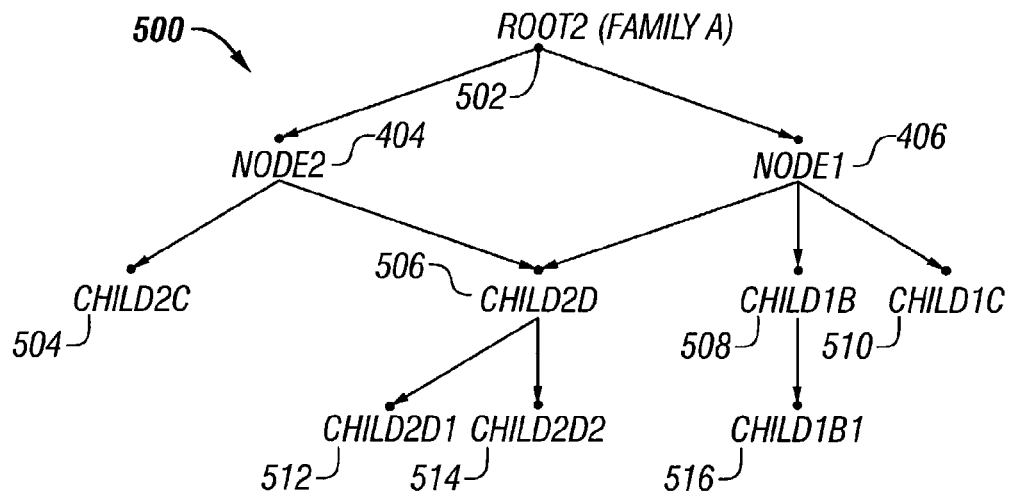
Figure 5A:
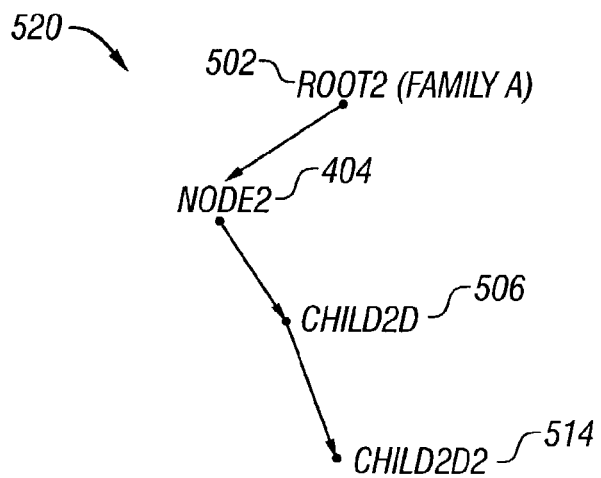
Figure 5B:
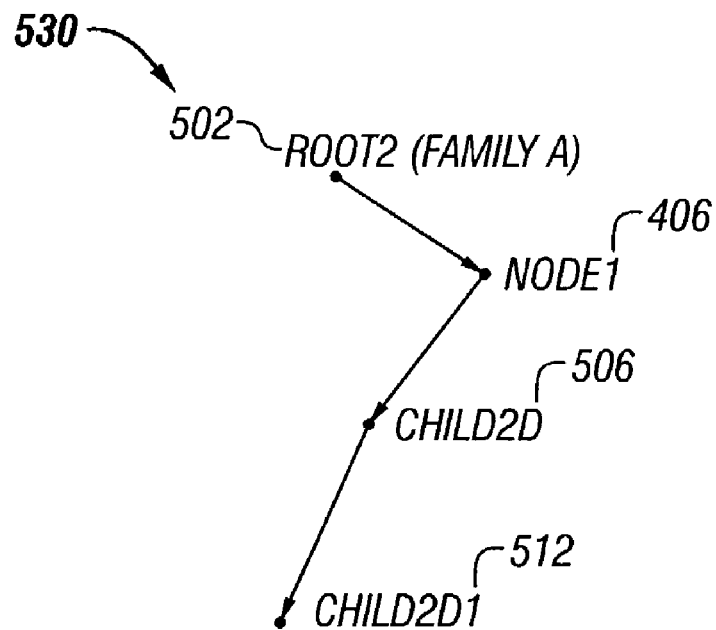
Figure 6:
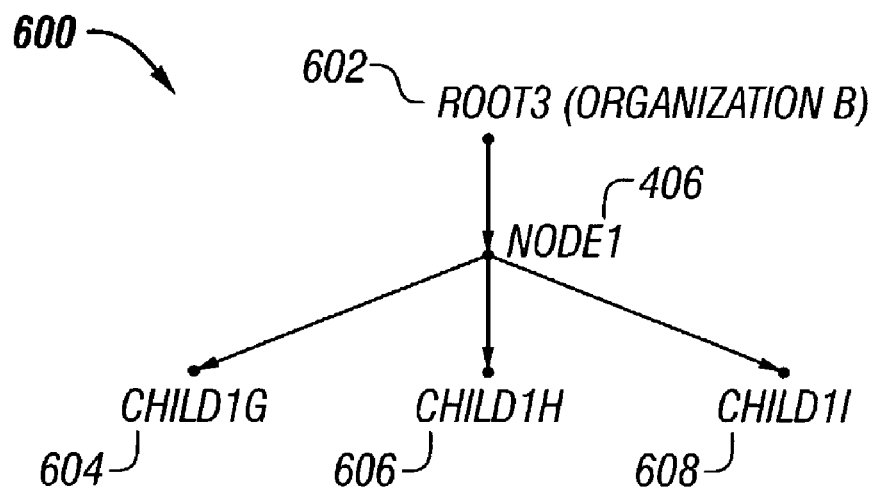

FIG. 5, including FIGS. 5A and 5B, is a "node-link" graphical representation of a second hierarchy and its sub-hierarchies FIG. 6 is a "node-link" graphical representation of a third hierarchy.

Figure 4:
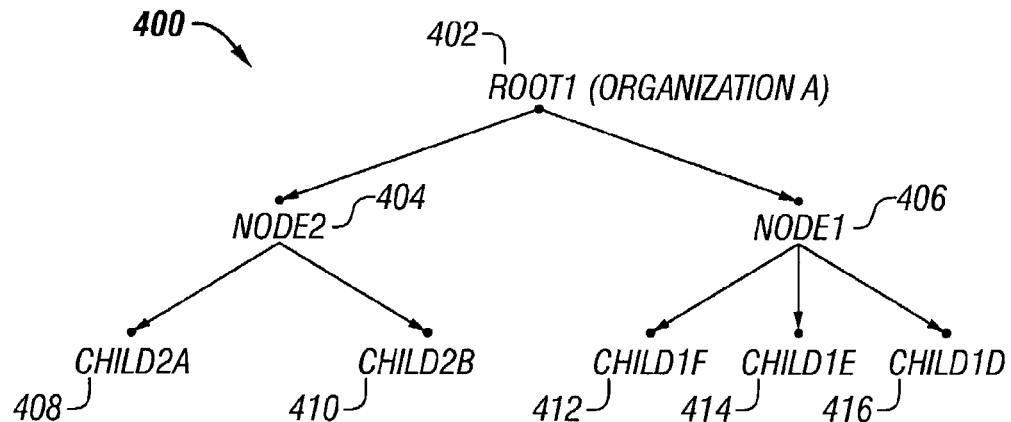
FIG. 4 is a "node-link" graphical representation of a first hierarchy.
Figure 7:
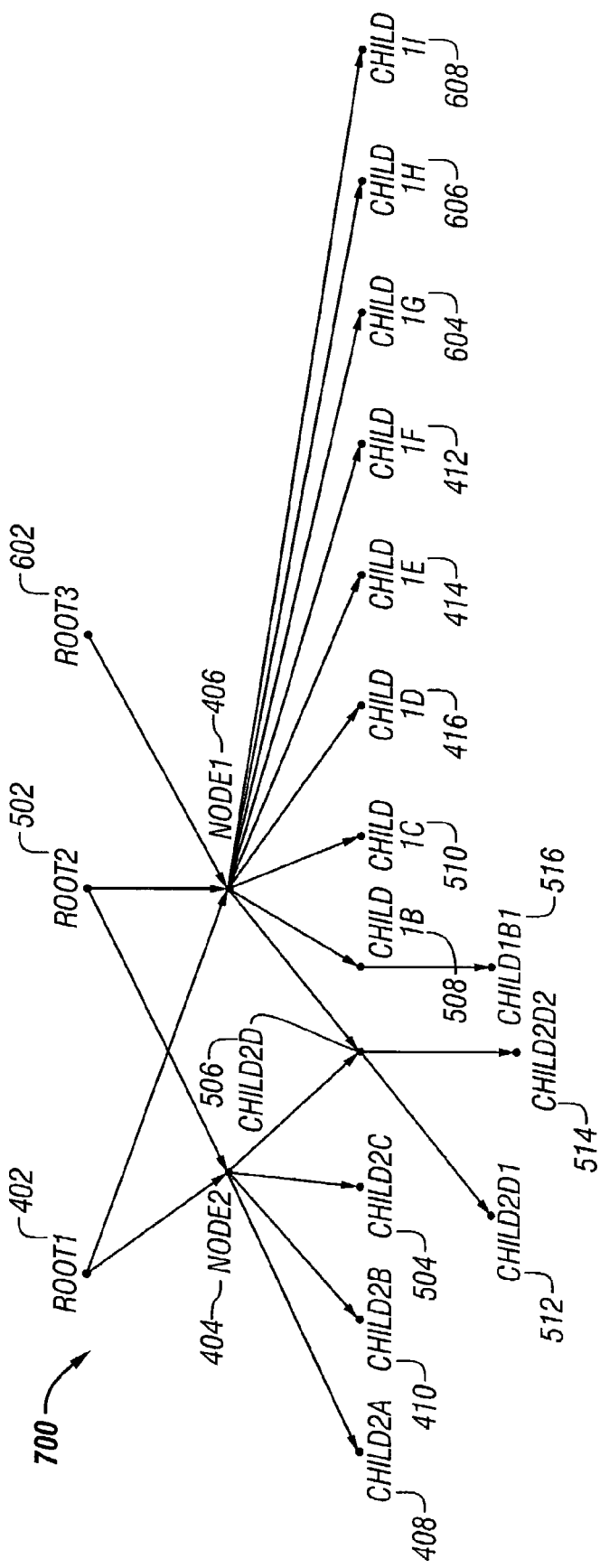

FIG. 7 is a "node-link" graphical representation of a directed graph combining the plurality of first, second, and third hierarchies as described in FIGS. 4, 5, and 6.

Figure 8:
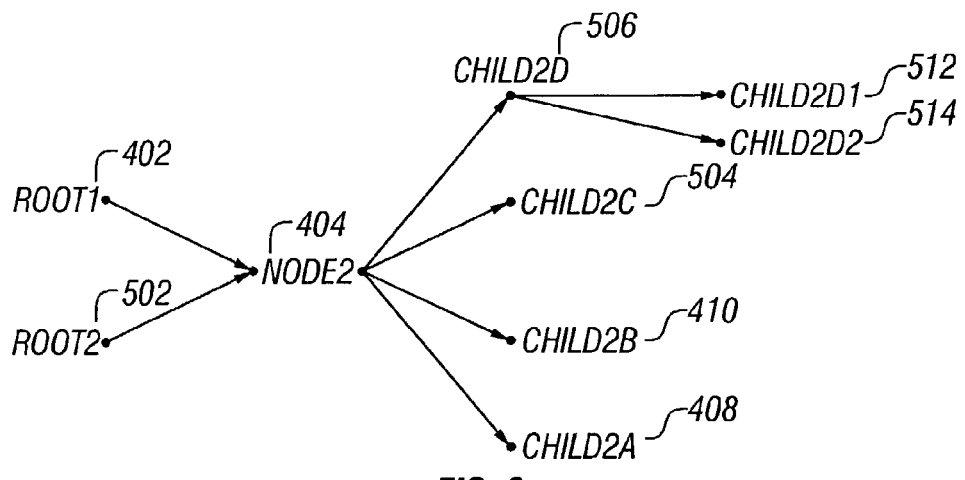

FIG. 8 is a "node-link" graphical representation of a "fisheye" view of focus node, Node2, of the directed graph illustrated in FIG. 7.

Figure 9:
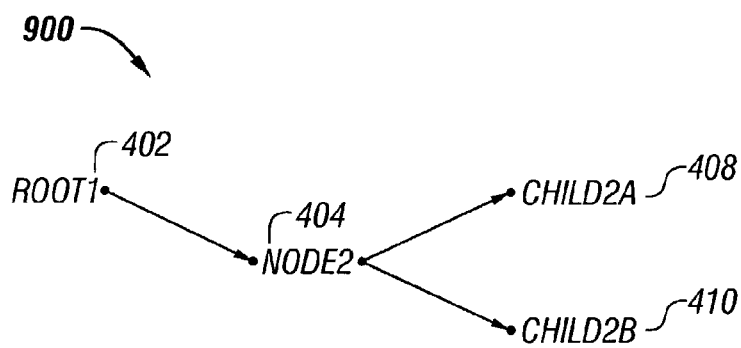

FIG. 9 is a "node-link" graphical representation of a "fisheye" view of the focus node, Node2, in the context of Root1.

Figure 10:
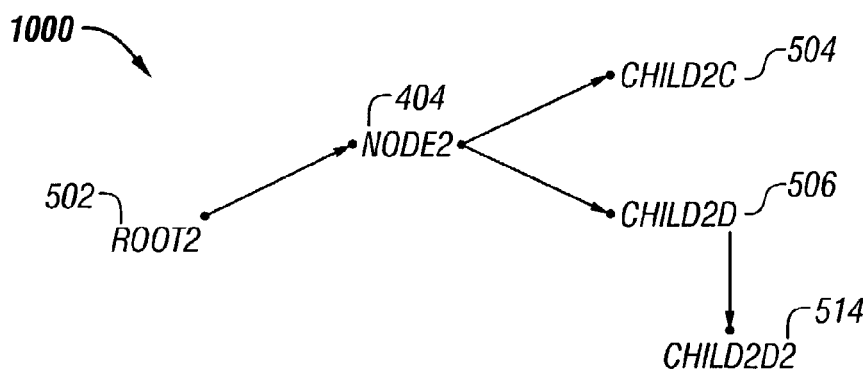

FIG. 10 is a "node-link" graphical representation of a "fisheye" view of the focus node, Node2, in the context of Root2.

Figure 11:
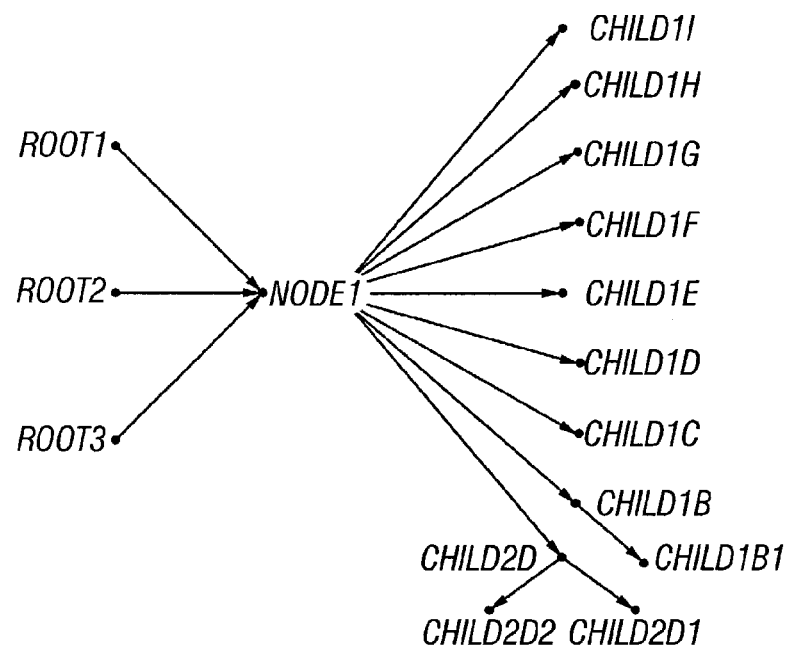

FIG. 11 is a "node-link" graphical representation of a "fisheye" view of the focus node, Node1, of the directed graph illustrated in FIG. 7.

Figure 12:
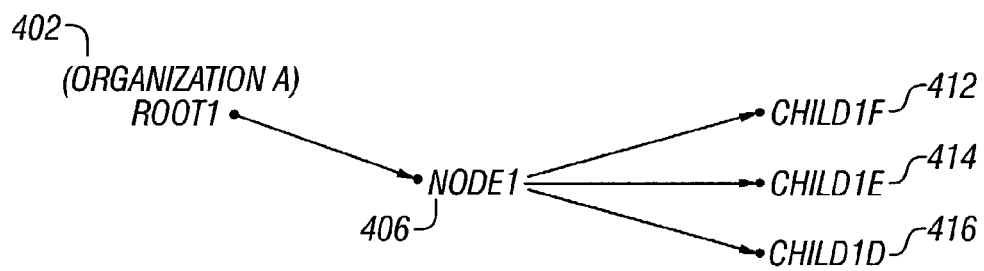

FIG. 12 is a "node-link" graphical representation of a "fisheye" view of the focus node, Node1, in the context of Root1.

Figure 13:
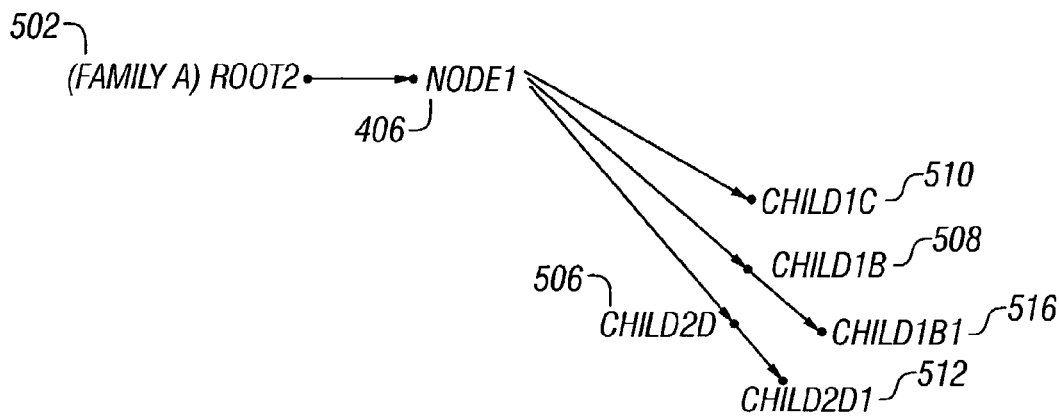

FIG. 13 is a "node-link" graphical representation of a "fisheye" view of the focus node, Node1, in the context of Root2.

Figure 14:
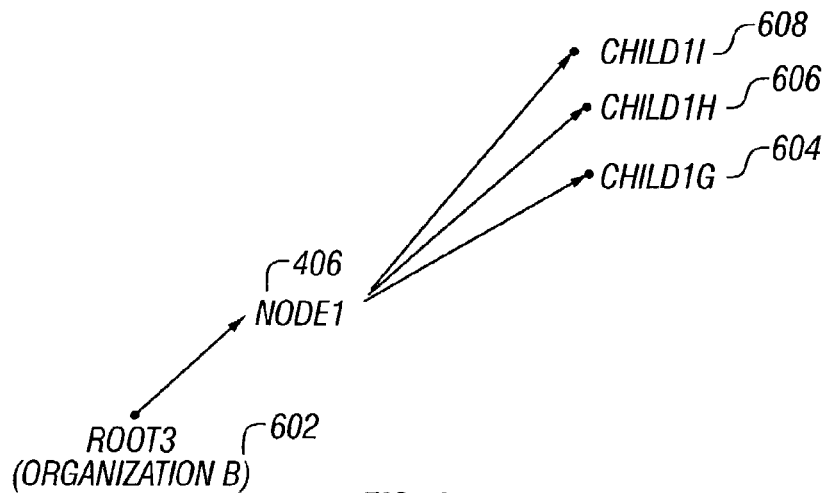

FIG. 14 is a "node-link" graphical representation of a "fisheye" view of the focus node, Node1, in the context of Root3.

Figure 15:
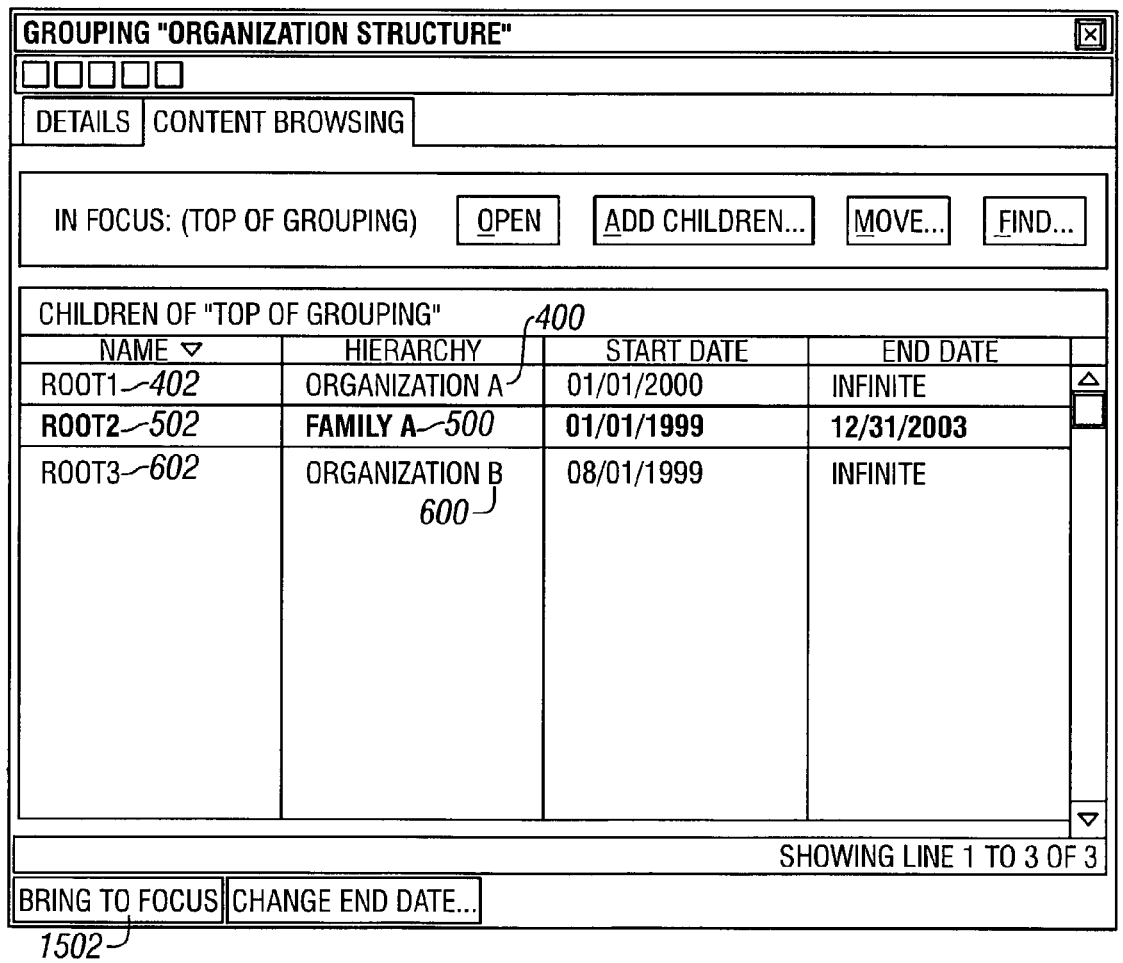

FIG. 15 is an exemplary screen display illustrating a textual representation of the root nodes, Root1, Root2, and Root3 of the directed graph illustrated in FIG. 7.

FIG. 16 is an exemplary screen display illustrating a textual representation of a "fisheye" view of the root node Root2.

FIG. 17 is an exemplary screen display illustrating a textual representation of a "fisheye" view of the focus node, Node1, in the context of Root2.

Figure 18:
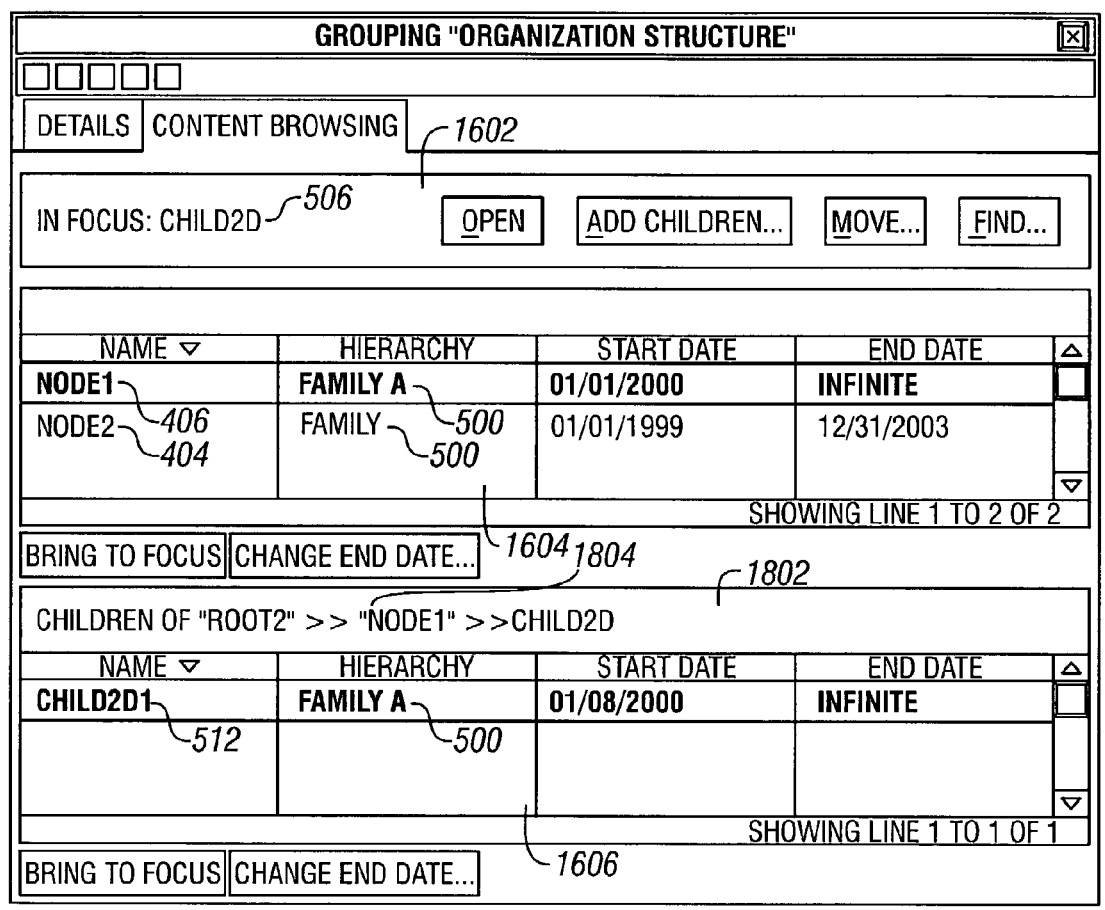

FIG. 18 is an exemplary screen display illustrating a textual representation of a "fisheye" view of the focus node, Child2d, in the context of Root2 and Node1.

FIG. 19 is an exemplary screen display illustrating a textual-format representation of an interface that allows a user to identify a node via a "find" feature rather than via traversal of the nodes.

FIG. 20 is an exemplary screen display illustrating an embodiment of a textual-format representation of a find grouping.

Figure 21:
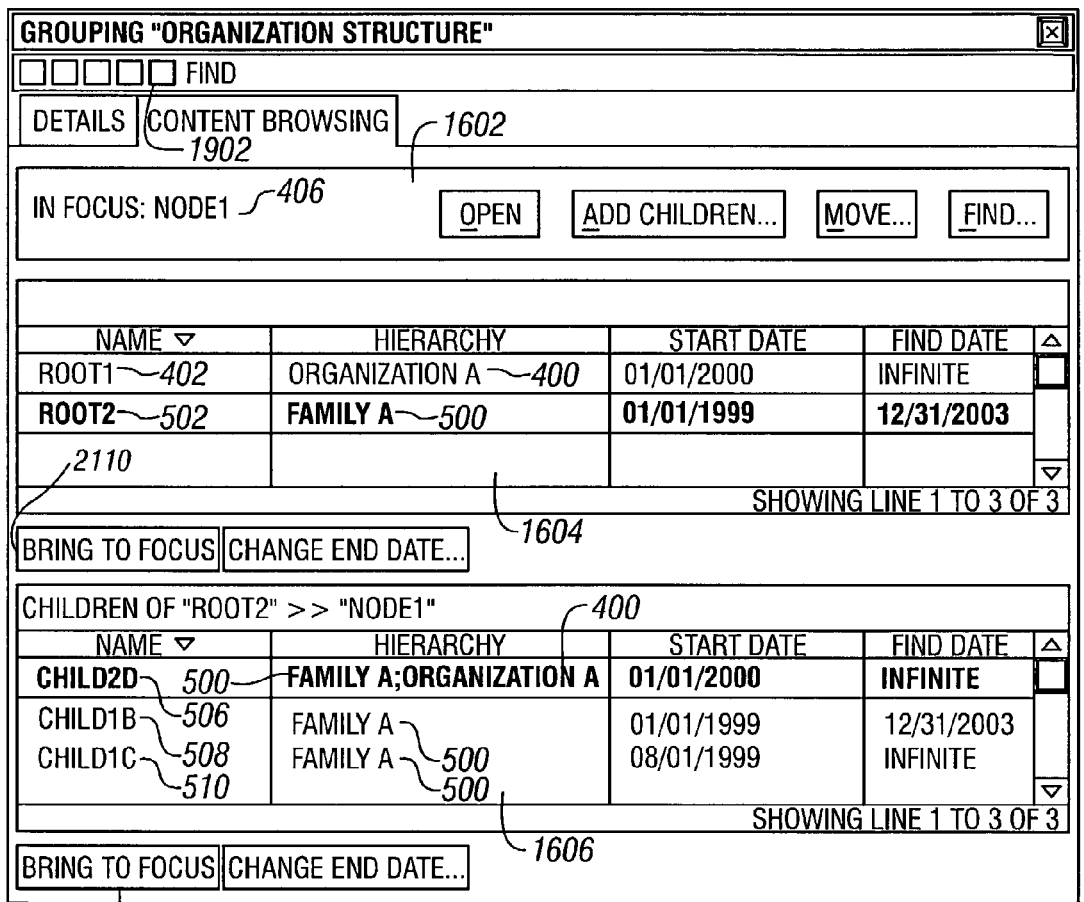

FIG. 21 is an exemplary screen display illustrating a textual-format representation of an interface that allows a user to identify a node via a "find" feature in conjunction with traversal of the nodes.

FIG. 22 is an exemplary screen display illustrating an embodiment of a textual-format representation of a find grouping.

Figure 23:
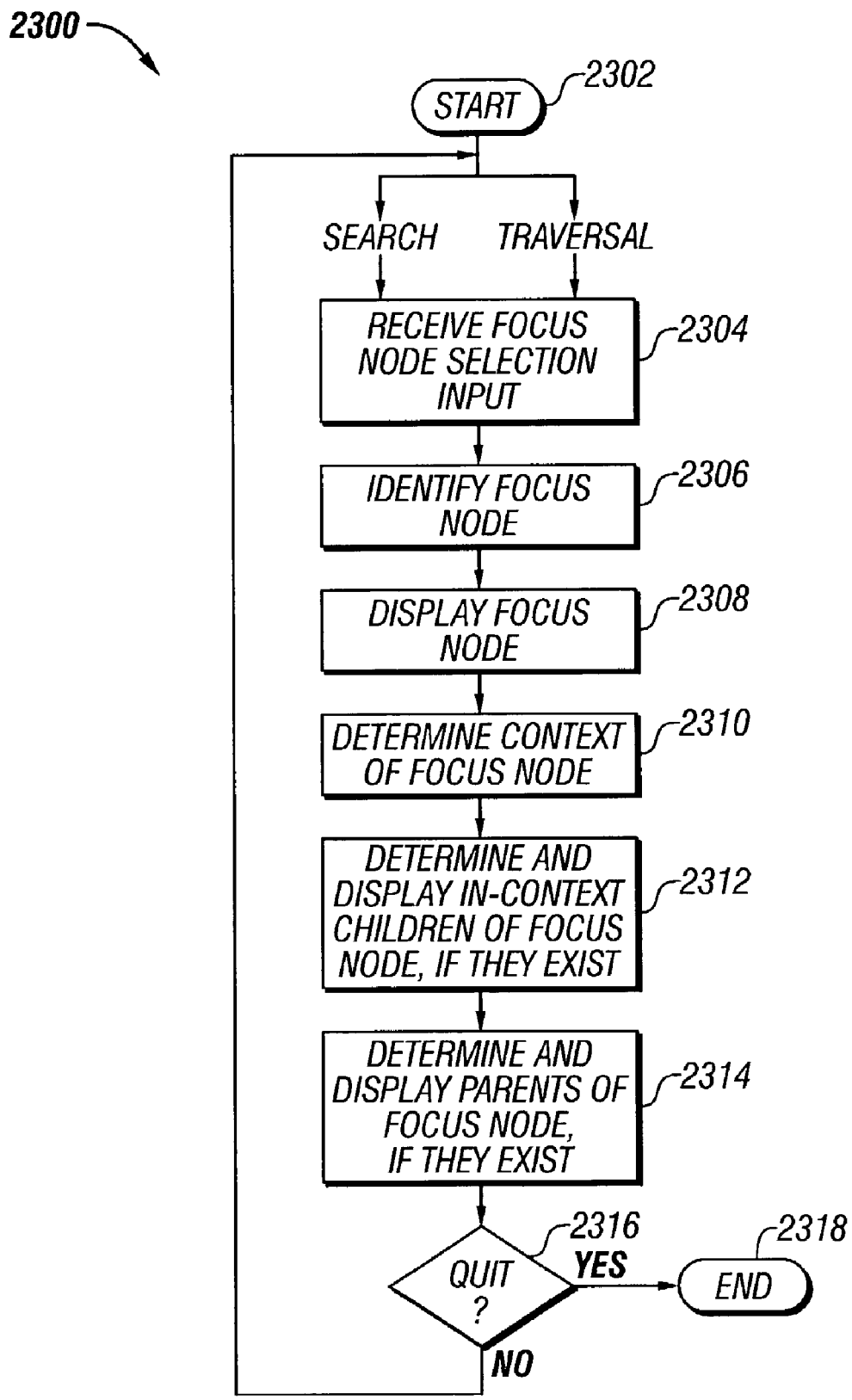

FIG. 23 is a flow chart illustrating a generalized method for navigating and displaying hierarchical data according to at least one aspect of the present invention.

FIG. 24 is an exemplary screen display illustrating a textual-format representation of an interface that allows a user to select a new focus node from among the parent nodes (Root1, Root2) of a current focus node, Node1.

Figure 25:
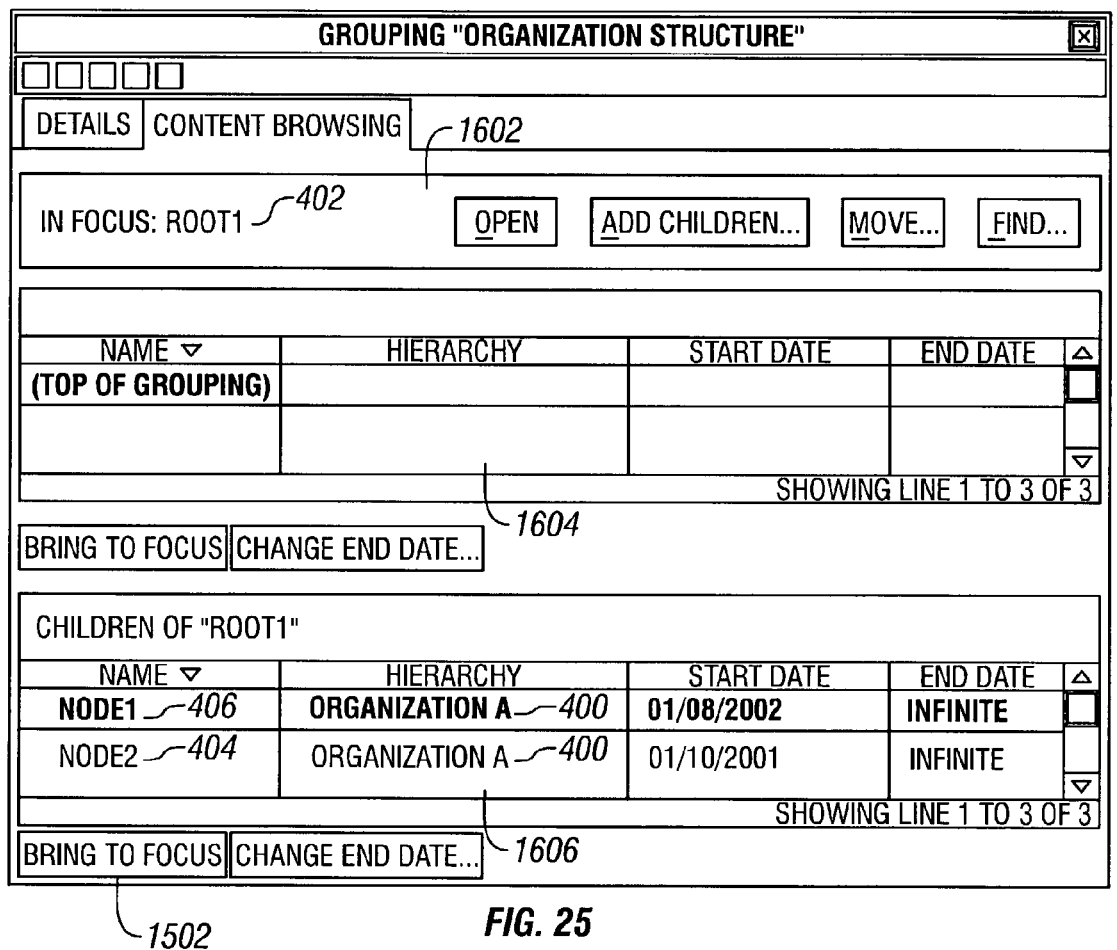

FIG. 25 is an exemplary screen display illustrating a textual representation of a "fisheye" view of the root node Root1.

Figure 26A:
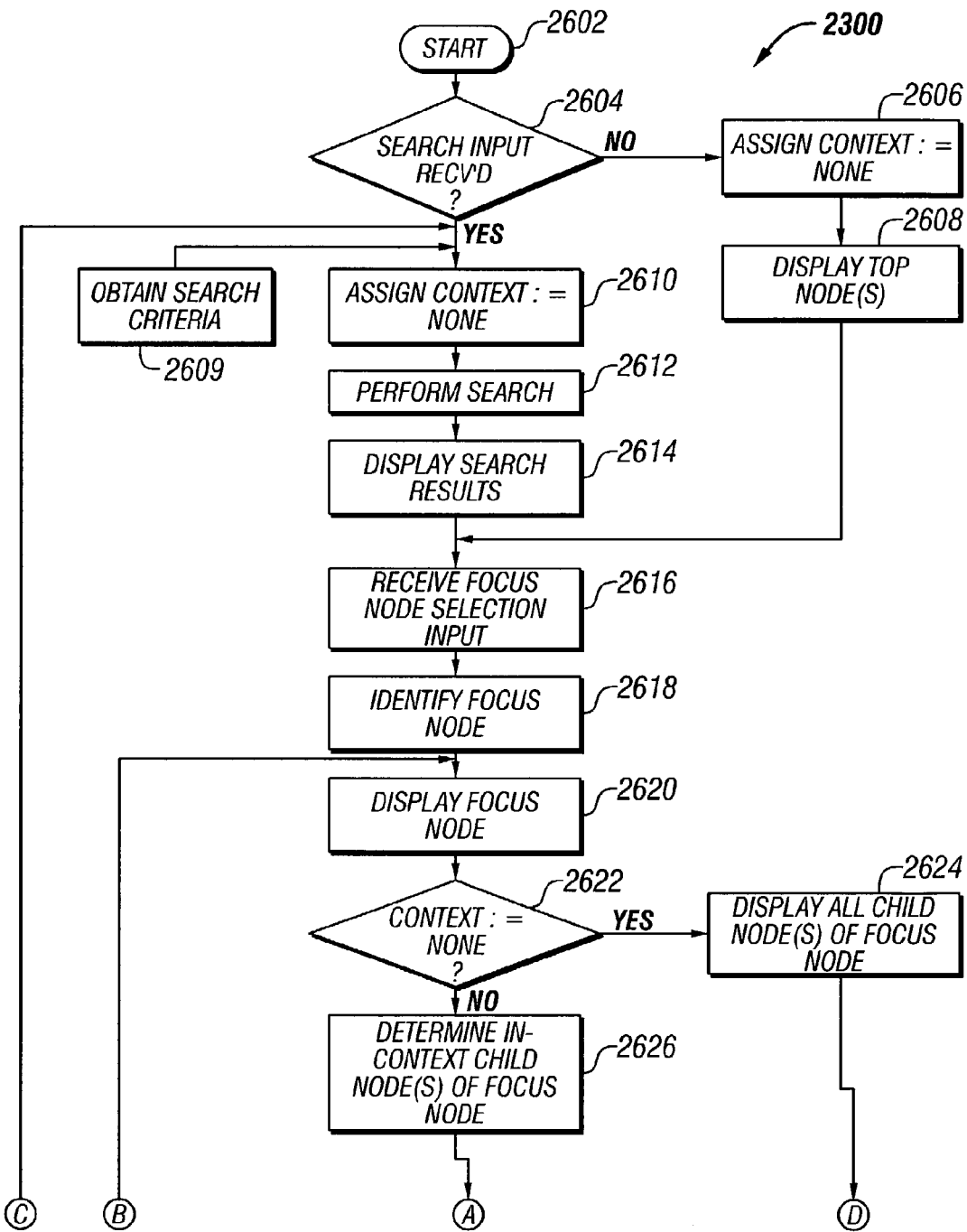
Figure 26B:
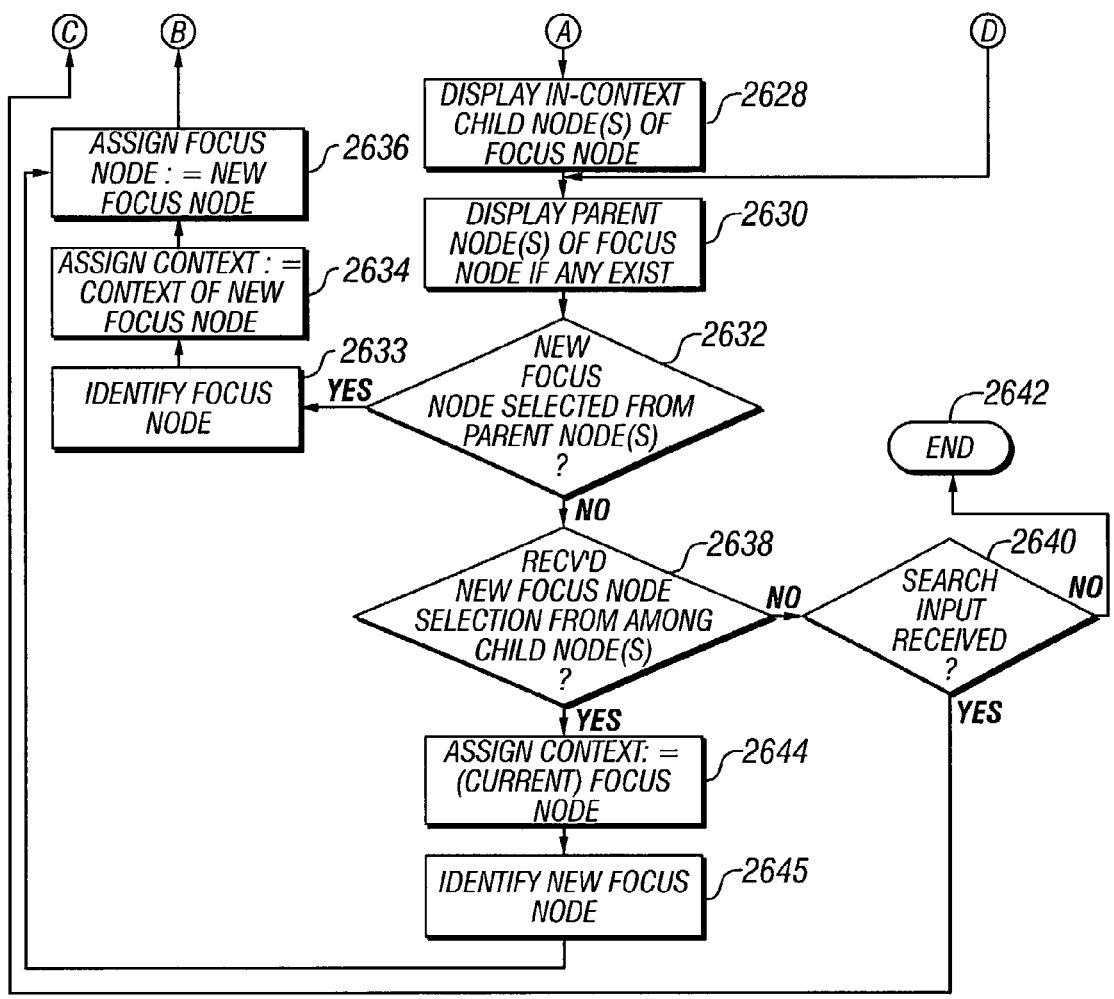

FIG. 26, including FIG. 26A and FIG. 26B, is a flow chart illustrating in detail at least one embodiment of a method of presenting for navigating and displaying hierarchical data according to at least one aspect of the present invention.

Figure 27:
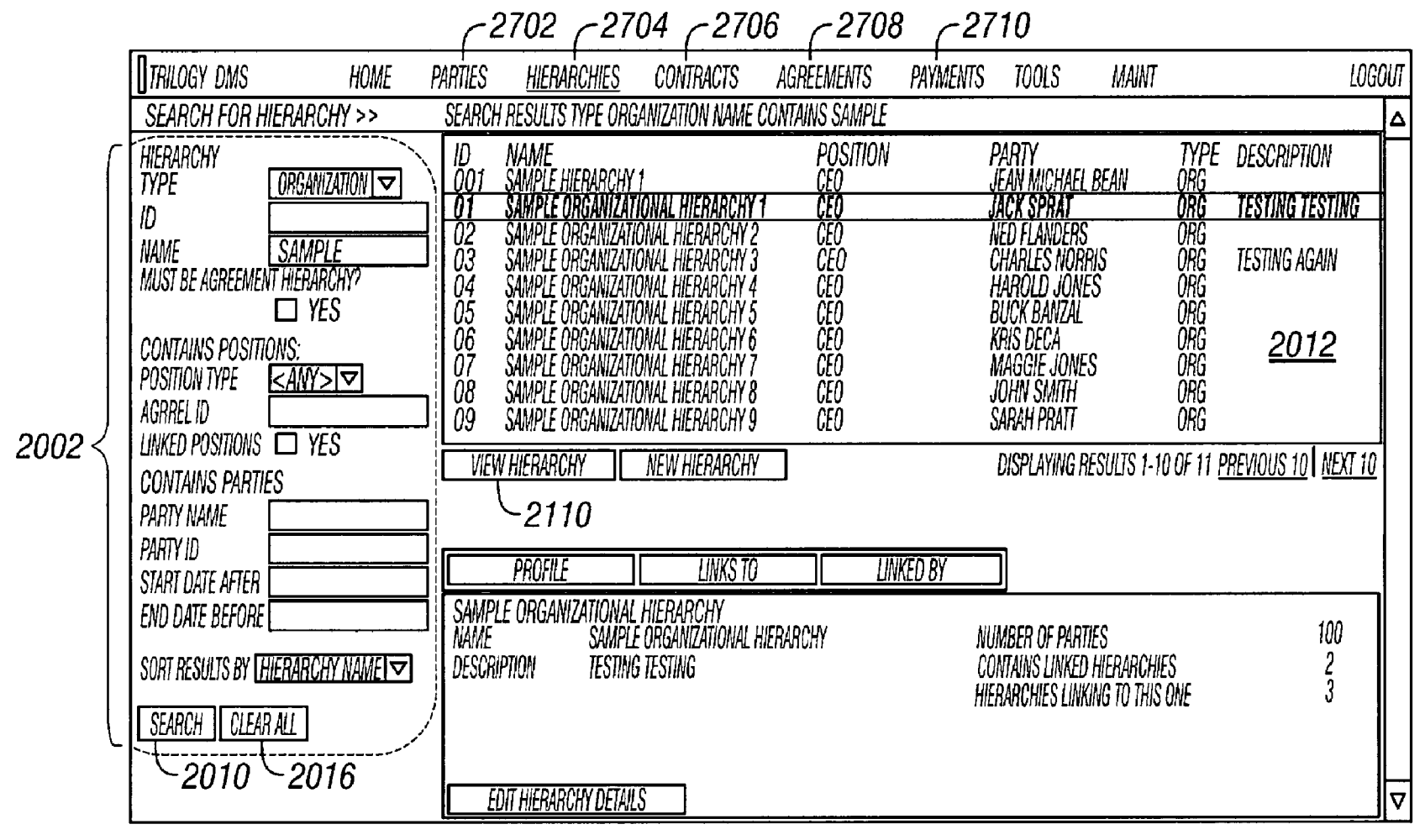

FIG. 27 is an exemplary screen display illustrating an alternative textual-formal representation of an interface that allows a user to identify a node from among a plurality of hierarchies via a "find" feature.

Figure 28:
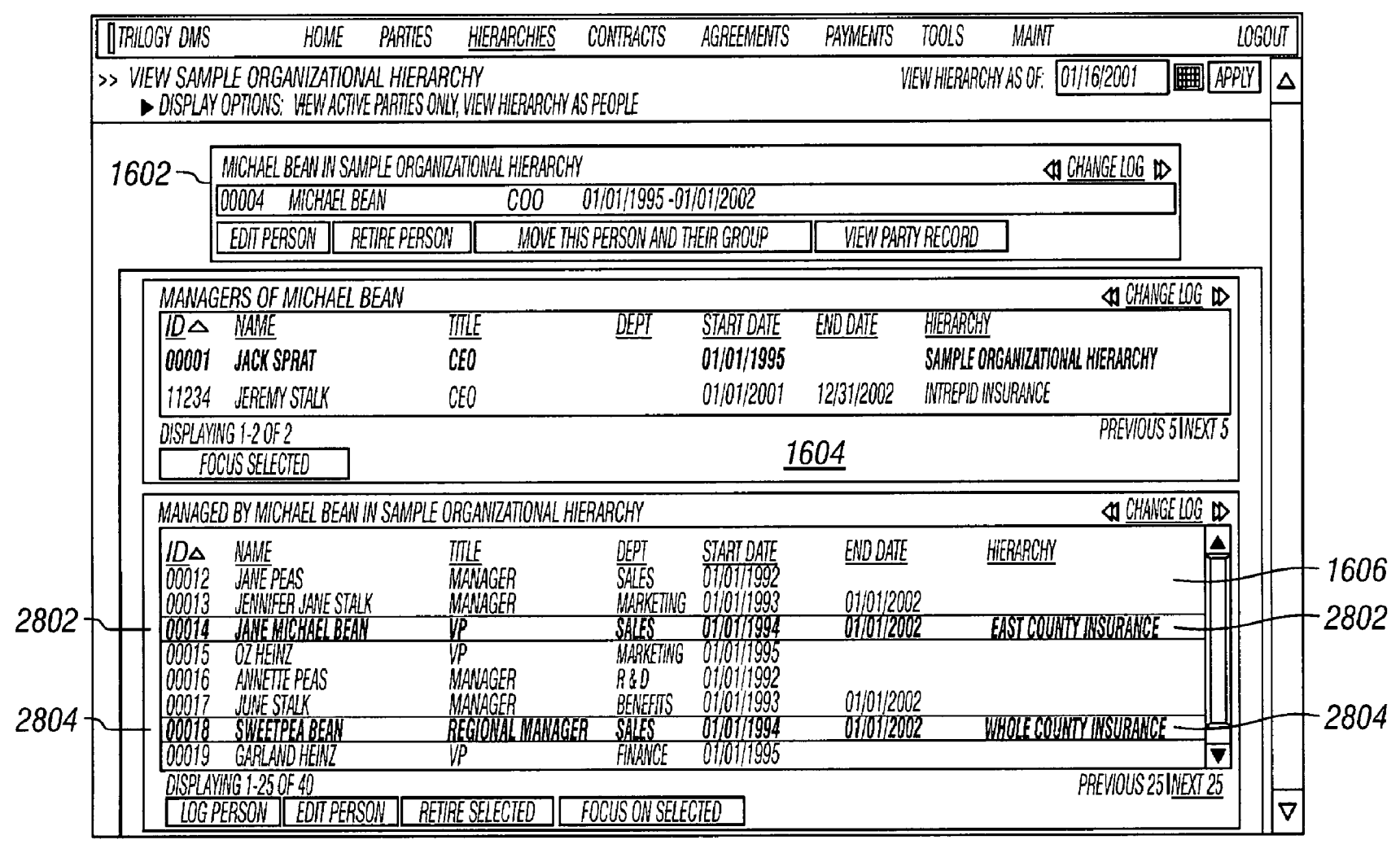

FIG. 28 is an exemplary screen display illustrating visual differentiation among hierarchies.

Figure 29:
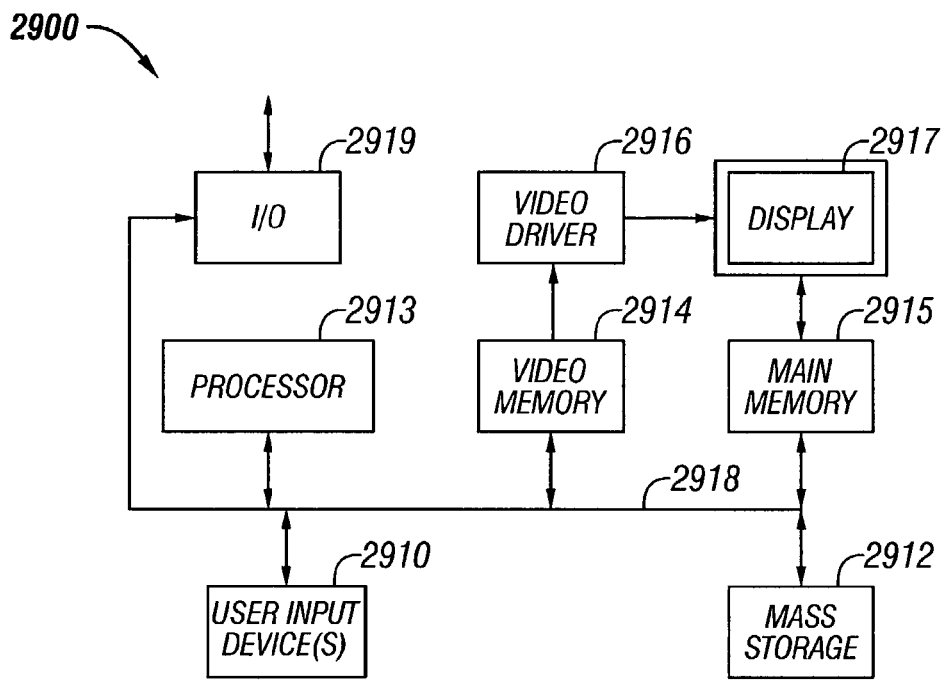
Figure 30:
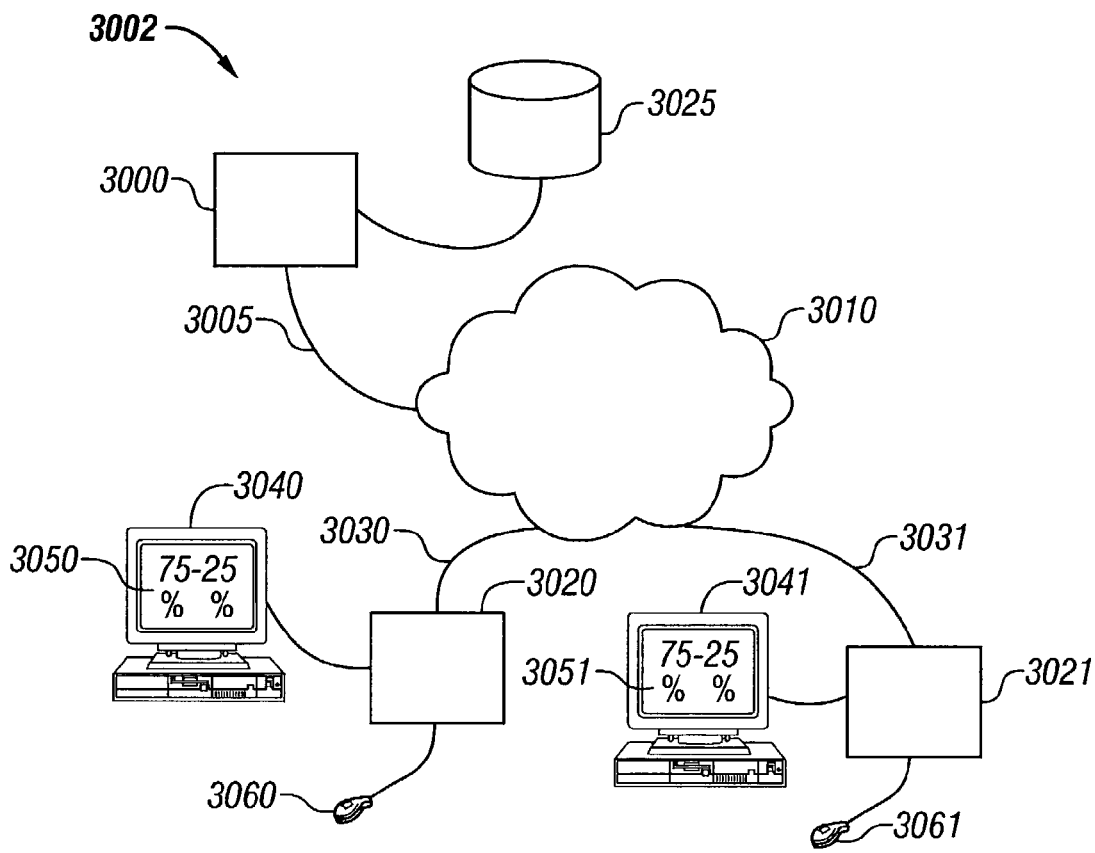

FIG. 29 illustrates an exemplary general-purpose computer on which at least one embodiment of the present invention can be implemented FIG. 30 is a system diagram showing a computer network environment in which at least one embodiment of the present invention may be practiced.

Figure 31:
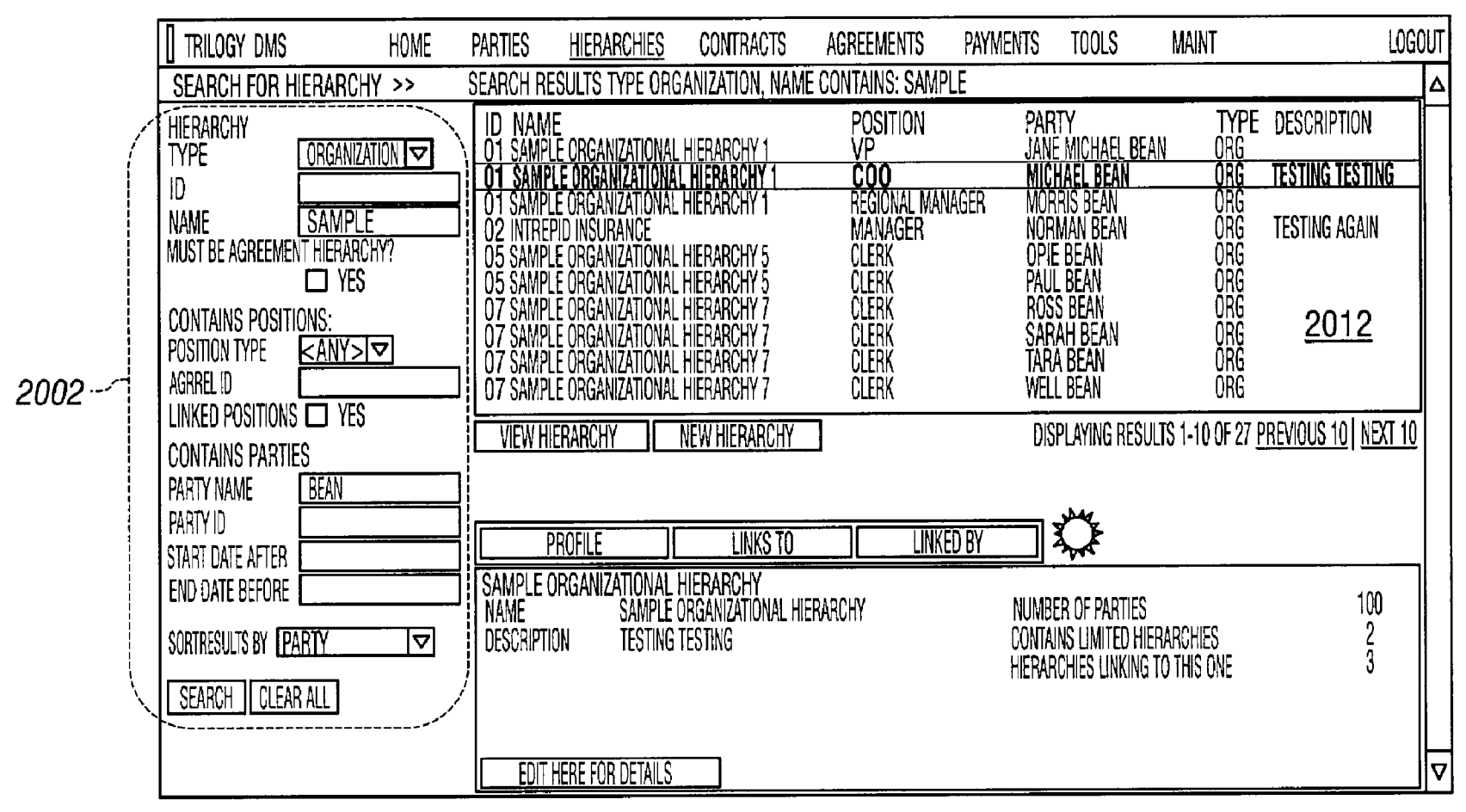

FIG. 31 is an exemplary screen shot illustrating presentation if additional search criteria to a user.

Figure 32:
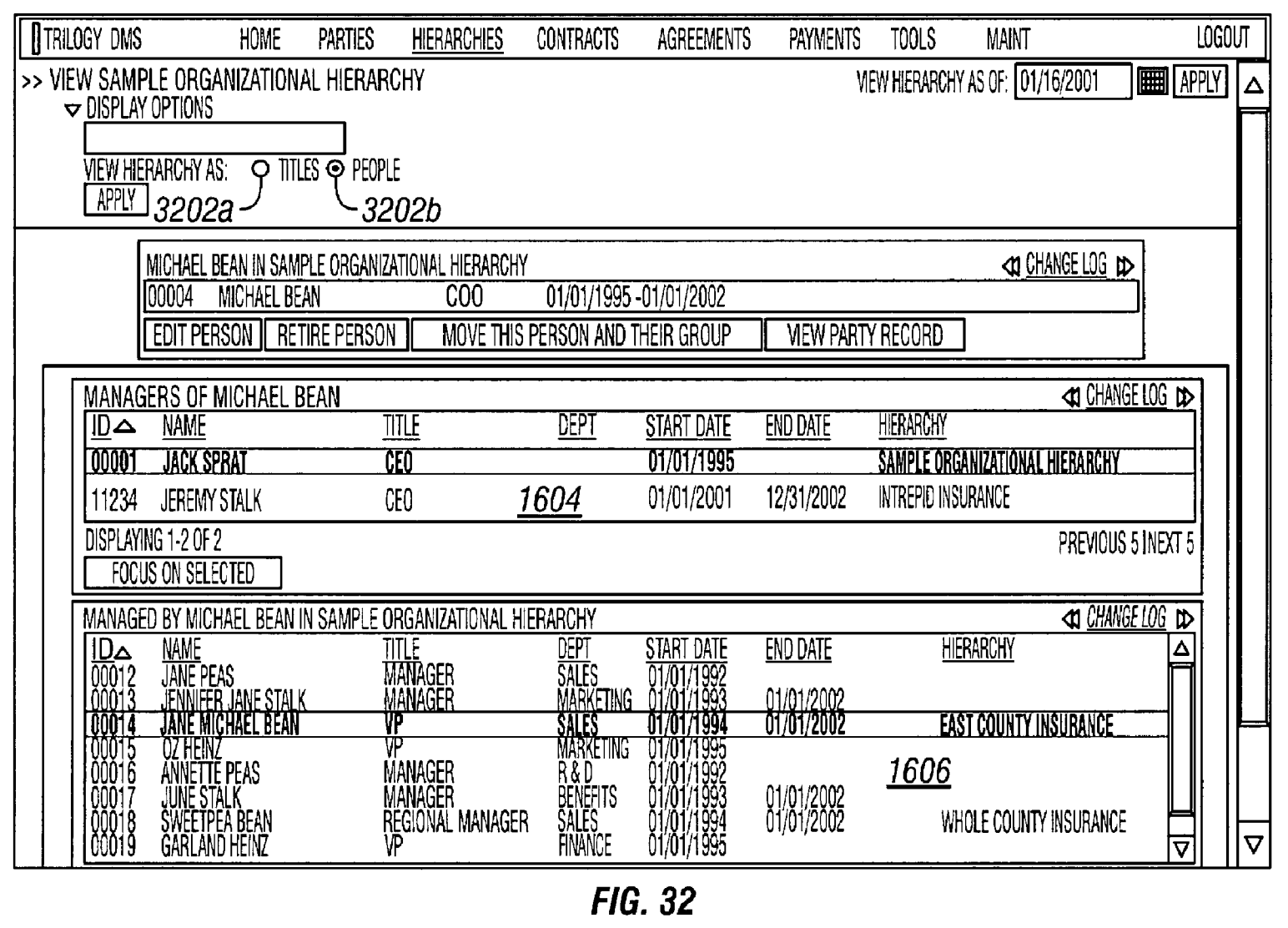

FIG. 32 is an exemplary screen shot illustrating presentation of display options to a user.

Figure 33:
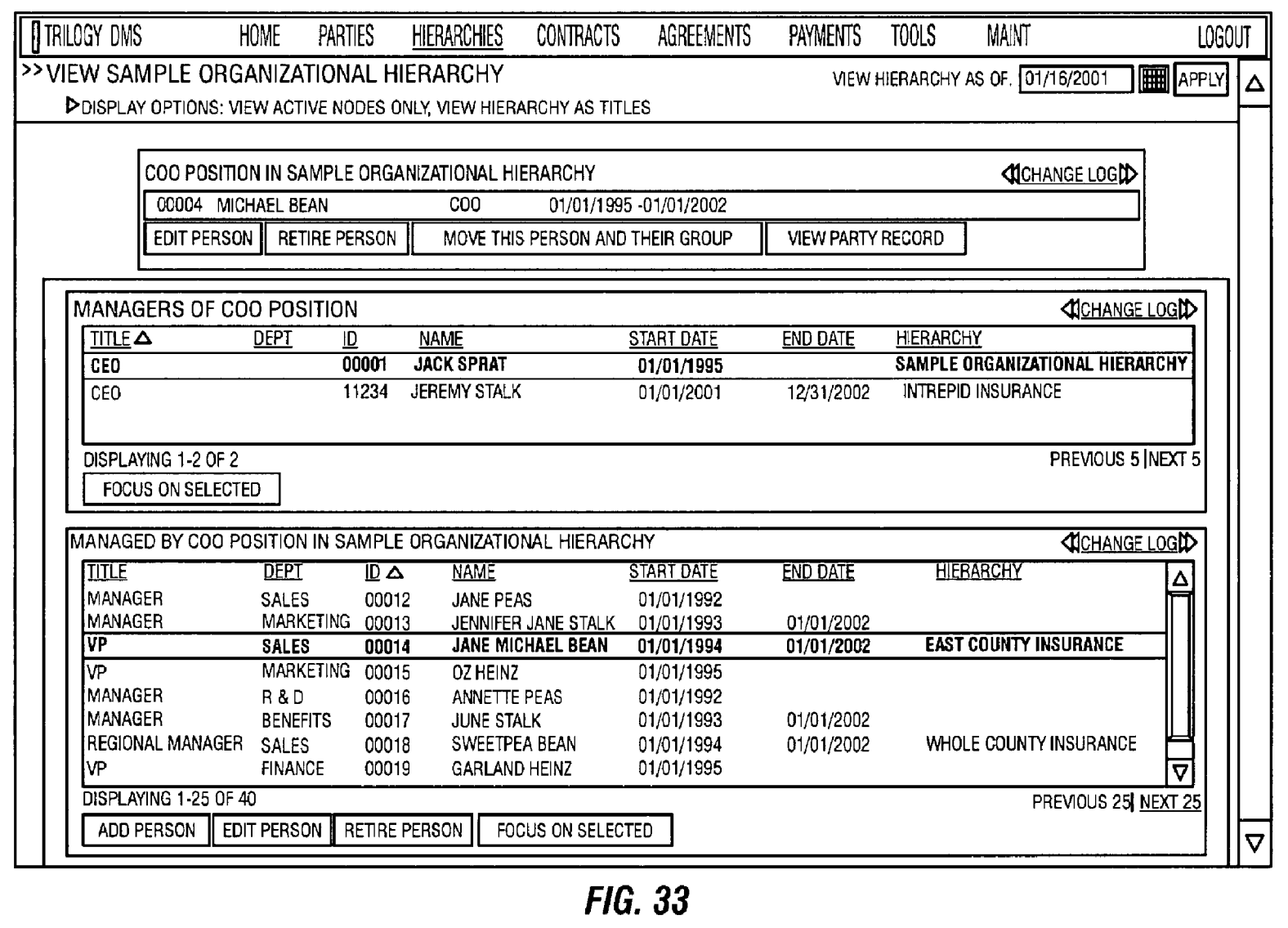

FIG. 33 is an exemplary screen shot illustrating a display generated as a result of a user's selection of the view-by-title display option.

Figure 34B:
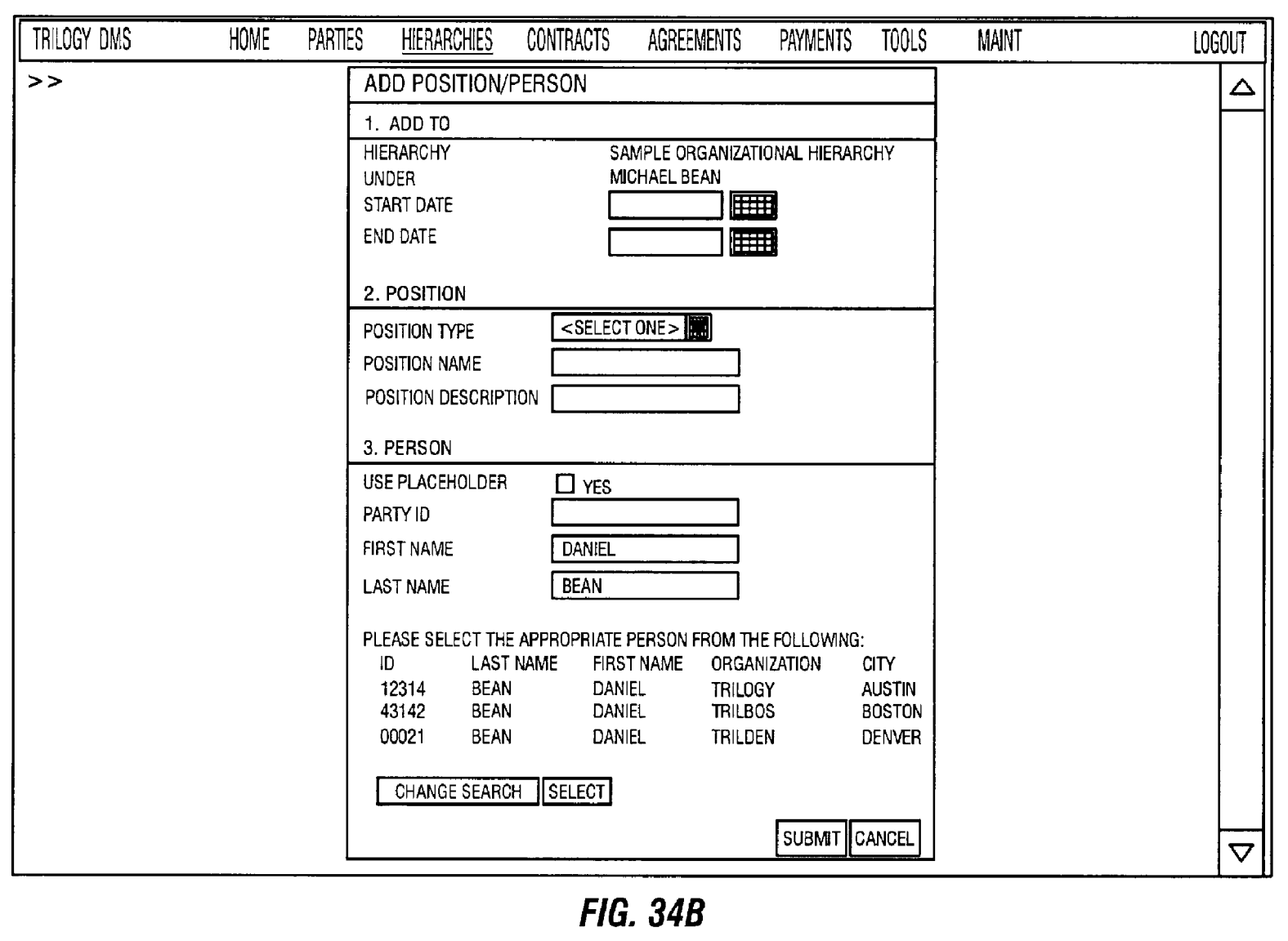

FIGS. 34a and 34b are exemplary screen shots relating to adding a position or party in a graph.

Figure 35:
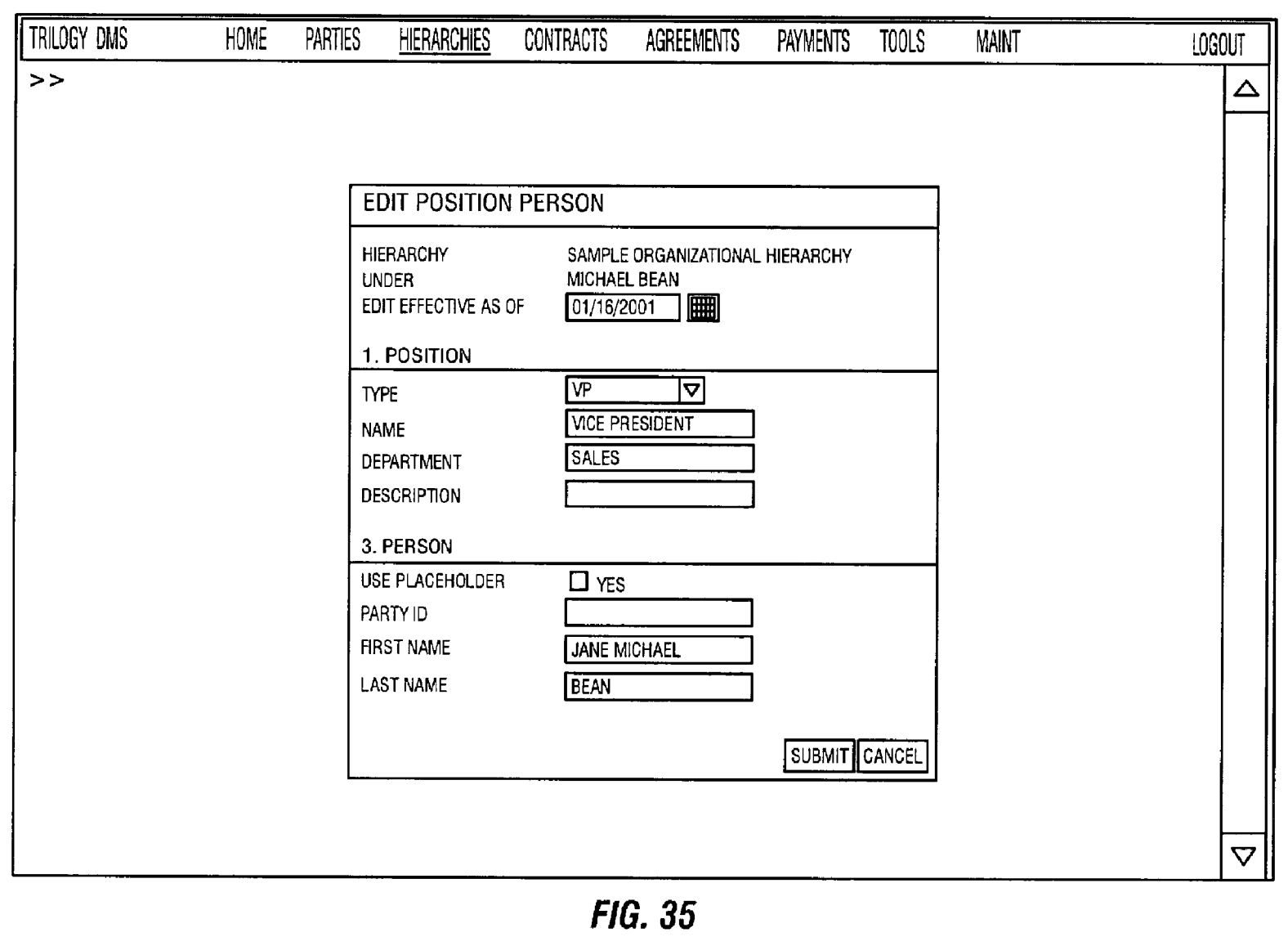

FIG. 35 is an exemplary screen shot illustrating the option of editing a person or party record in a graph.

FIG. 36 is an exemplary screen shot illustrating the options of retiring a party and/or position from a graph.

Figure 37:
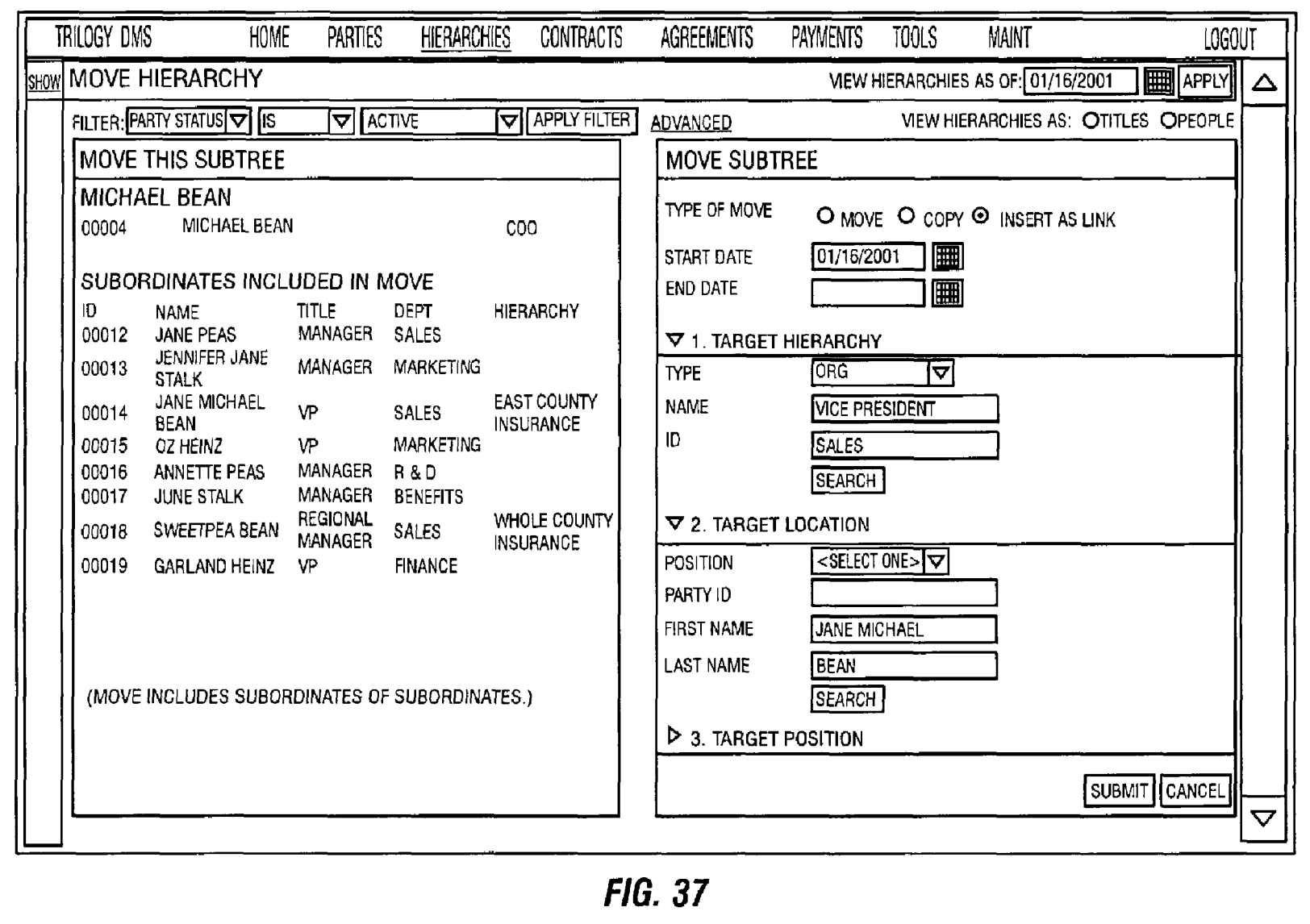

FIG. 37 is an exemplary screen shot illustrating the option of and moving a sub-tree of a graph.

DETAILED DESCRIPTION

Overview

The method and system described herein provide for a user interface that allows user navigation, display, and manipulation of data stored as a directed graph of relational objects. The graph represents a plurality of hierarchies, wherein at least one of the hierarchies shares a common node with another of the hierarchies, but the two hierarchies sharing the common node do not fully share, if at all, the exhaustive child sub-tree of the common node. When a focus node is selected from among the relational objects forming the graph, its context is determined. Context relates to the parent node that has been selected for the focus node. The term "context" relates generally to the hierarchy that the selected focus node and parent node refer to. Two parents of the same focus node may be associated with different child nodes of the focus node. Accordingly, the term "context" is often used herein to refer to the selected parent for a focus node.

After context for a selected focus node has been determined, the in-context children of the focus node, from among the next-lower level of nodes of the focus node, are determined and displayed. This process may be repeated iteratively, in order to accomplish a top-down traversal of the graph. Bottom-up traversal is also supported, wherein a parent node of the focus node is selected as the new focus node. Selection of a focus node may be effected either through traversal or through a "find" function that searches for the nodes of interest that match user-provided search criteria.

The method may be implemented as module(s) of software, hardware, firmware, or any combination thereof. The system, or portions thereof, may be likewise implemented in software, firmware, hardware, or any combination thereof.

Structure and Methodology

Various alternatives of "node-link" structures that are used to represent hierarchical data include trees, graphs, directed acyclic graphs, multitrees, and multiple-hierarchy graphs wherein at least two of the hierarchies share a common node but do not share all of the elements of the exhaustive child sub-tree of the common node.

A "node-link" structure is a structure that includes items that can be distinguished into nodes and links, with each link relating two or more nodes. A "graph" is a node-link structure in which each link relates two nodes. A "directed graph" is a graph in which each link indicates direction between the nodes it relates, with one node being a source node and the other being a destination node. Source nodes are commonly referred to alternatively as "parent nodes" or "from-nodes." Destination nodes are commonly referred to alternatively as "child nodes" or "to-nodes." A "directed acyclic graph" (DAG) is a directed graph in which the links, when followed in their indicated directions, do not provide a path from any node back to itself.

Figure 1:
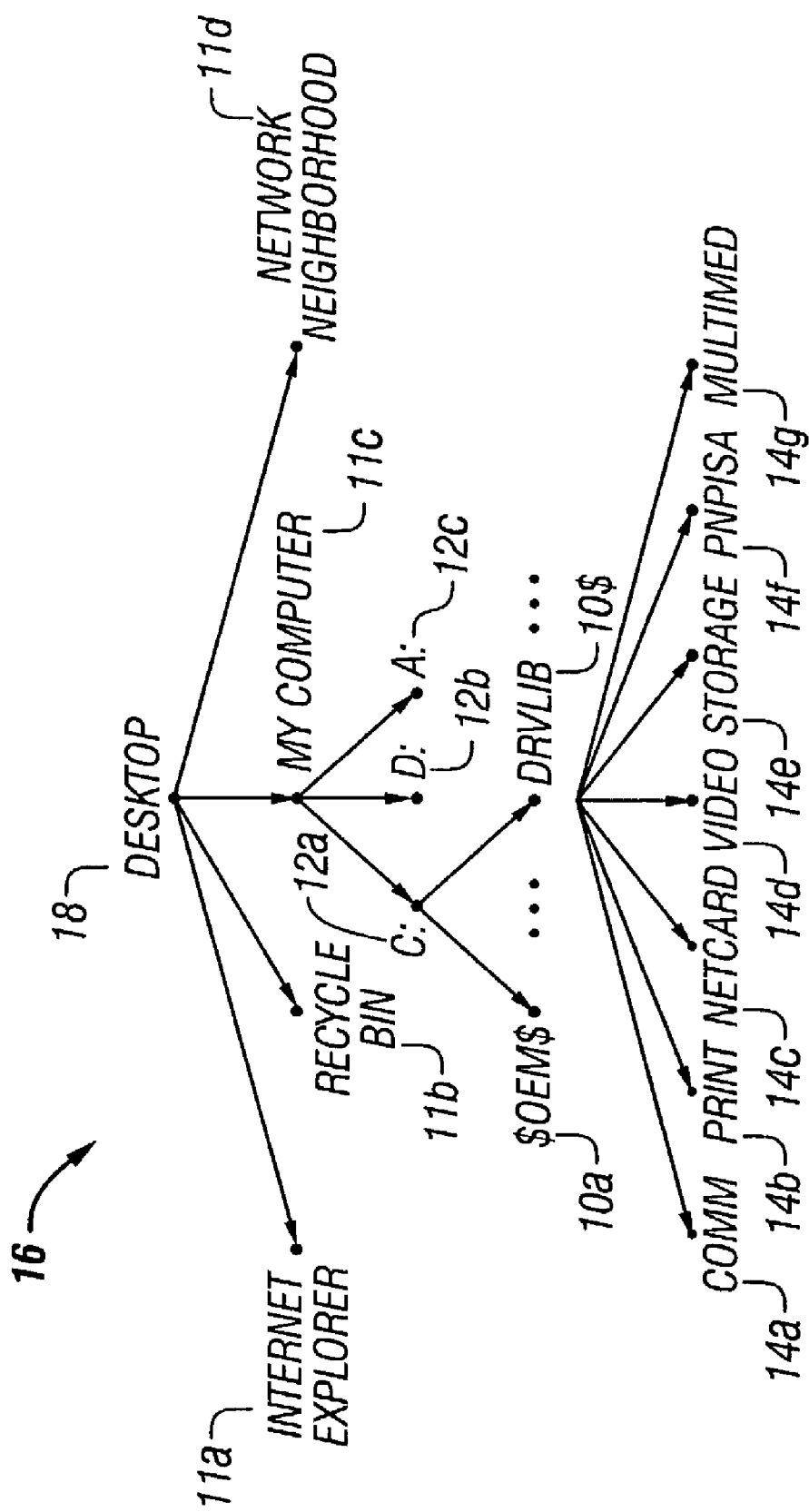
FIG. 1 is a prior art "node-link" graphical representation of a tree structure.

FIG. 1 illustrates a graphical representation of a tree 16. A tree is a non-linear data structure having one or more nodes 10, 11, 12, 14. One constraint of a tree 16 is that each Node 10, 11, 12, 14 of the tree 16, except the root Node 18, is subordinate to (or, the "child") of one and only one other node. That is, a tree 16 is a DAG with exactly one root Node 18 such that, for any non-root Node 10, 11, 12, 14 in the tree, the links, when followed in their indicated directions, provide only one path that begins at the root Node 18 and leads to the non-root node. For instance, for the non-root node Video 14d, only one path leads from the root node "Desktop" 18 to Video 14d. The path begins at Desktop 18, traverses through "My Computer" 11c and "C:" 12a and then through "Drvlib" 10s to reach Video 14d.

Accordingly, trees provide that a node may be reached only by way of a single parent node, without shortcuts or alternative organizations. An advantage of trees is that they are easily traversed and are therefore relatively easily viewed and navigated by a user.

Figure 2:
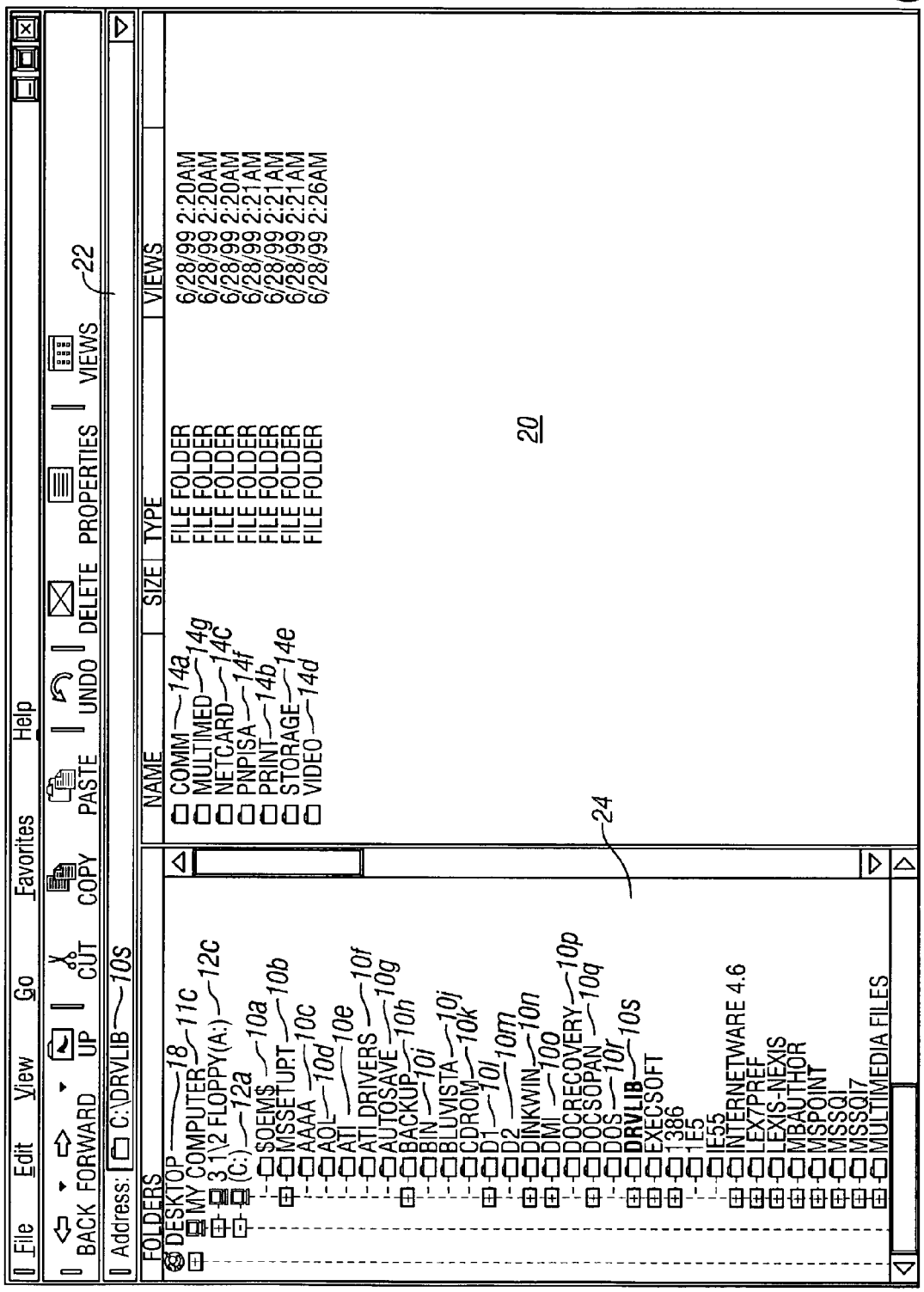
FIG. 2 is an exemplary screen display illustrating a prior art textual representation of the tree structure illustrated in FIG. 1.

FIG. 2 illustrates a textual representation of the tree structure illustrated in FIG. 1. For a selected focus node, such as Drvlib 10s, the child nodes 14a–14g at the next level of the tree 16 are displayed in textual format in a window 20. The focus Node 10s is displayed in textual format in a separate window 22. In a third window 24, a textual display allows one to determine, based on the position of the text, that the focus Node 10 is the child of "C:" 12a, which is the child of "My Computer" 11c, which is the child of "Desktop" 18, the root node.

A more versatile structure for representing hierarchical data is a graph. A graph consists of a collection of zero or more nodes connected by zero or more edges, where each edge connects a pair of nodes. A fully general graph allows many routes between nodes. However, unlike a tree, a fully general graph is not easily laid out, which renders navigation by a user more difficult than navigation of a tree.

A directed acyclic graph ("DAG") is somewhat easier to lay out than a fully general graph. The edges of a directed graph link two nodes together in only one direction. The DAG is "acyclic" when the directed links have no cycles, where a cycle is a path among three or more nodes of a graph that connects a node to itself.

Figure 3:
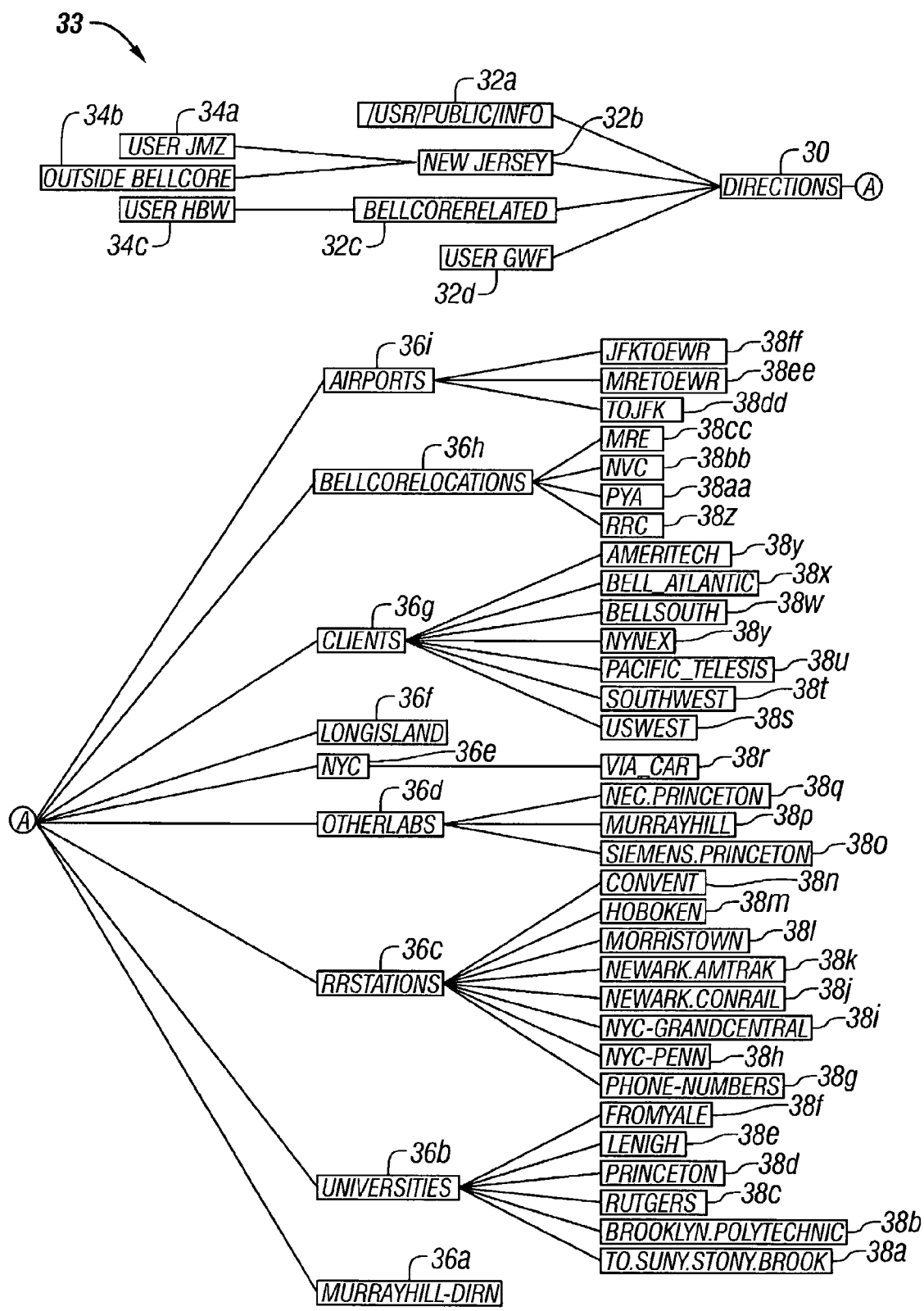
FIG. 3 is a prior art "node-link" graphical representation of "fisheye view" of a directed acyclic graph structure wherein a focus node has a plurality of parent nodes.

FIG. 3 illustrates a specialized type of DAG called a "multitree." Multitrees have been described by Furnas and Zacks in Furnas, George W., Zacks, Jeff, Multitrees: Enriching and Reusing Hierarchical Structure, *Proceedings of A CM CHI '94 Conference on Human Factors in Computing Systems* 330–336 1994, which is herein incorporated by reference. A multitree is a directed acyclic graph in which a portion of an existing hierarchy is reused and incorporated into a different hierarchy by adding new tree structure above existing, or newly added, disjoint complete sub-trees. A true multitree is constrained to contain no "diamonds"—that is, at most, only one directed path can occur between a pair of nodes. Relaxation of this constraint in certain situations nonetheless requires that diamonds be relatively long, or that nodes be virtually duplicated. For instance, Furnas and Zacks disclose that if diamonds are long then structures are still locally multitrees.

The multitree structure is further constrained such that the descendants of any node form a tree (which cannot be true if diamonds are present). In terms of viewing and browsing multitrees, Furnas and Zacks discuss various concepts that are helpful in providing a useful interface for users to view the hierarchical information.

FIG. 3 illustrates one such concept, called the "fisheye" view. FIG. 3 illustrates a view of a portion 33 of a hierarchy, wherein the portion represents ancestors 32, 34 and descendants 36, 38 of a central focus node, "Directions" 30. The fisheye view allows a smaller view and quick access to the portion 33 of interest to a user when navigating a large tree structure. While the multitree structure is a useful structure for hierarchies whose content (or sub-trees) are re-used among a plurality of hierarchies, it does not accommodate representation of a plurality of hierarchies that share, not complete sub-trees, but a common node having distinct sub-trees for each of the plurality of separate parent hierarchies (referred to as "contexts"). The multitree structure, even when its diamond-free constraint is relaxed, nonetheless requires that any diamond be relatively long. The multitree structure does not accommodate a four-node diamond.

FIGS. 4 through 7, including FIG. 5A and FIG. 5B, illustrate a graph 700 containing a plurality of hierarchies 400, 500, 600, with one hierarchy 500 further containing two hierarchies 520, 530. Root1 402 is the root node of a hierarchy 400 called Organization A. Root2 502 is the root node of a hierarchy 500 called Family A. The Family A hierarchy 500 further includes two sub-hierarchies 520, 530 as illustrated in FIG. 5A and FIG. 5B, respectively. Root3 602 is the root node of a hierarchy 600 called Organization B. FIGS. 4 through 7 illustrate that, in contrast to multitrees, the dependent sub-trees for a particular node in the graph 700 are not completely re-used among hierarchies. For instance, FIG. 7 illustrates that the sub-trees of children for Root1 402 and Root2 502 both include Node1 406 and Node2 404. However, FIGS. 5 and 7 illustrate that, rather than including the entire child sub-tree for Node2 404, the child sub-tree of Node2 in the "Family A" hierarchy 500 includes only Child2c 504 and does not include Child2a 408 nor Child2b 410. Similarly, the "Family A" hierarchy 500 includes only Child2d 506, child1b 508, and Child1c 510 as children of Node1 406 but does not include the remaining nodes (510, 412–416, 604–608) of the sub-tree of children for Node1 406 as illustrated in FIG. 7.

FIGS. 5, 5A, and 5B illustrate that the "Family A" hierarchy 500 further includes two sub-hierarchies 520, 530. The two sub-hierarchies 520, 530 share a common node (Child2d) 506, but the sub-tree of children of node Child2d 506 is not shared. This creates a four-node cycle or downward "diamond", which is not permitted in the multitree structure.

Accordingly, the inventors have determined that it is beneficial to utilize an interface that presents information to a user from a graph that includes at least one shared common node but does not re-use the full child sub-tree for the common node among the hierarchies. The inventors have determined that it is further beneficial to present information on the interface in a manner that provides a "fisheye" view of a relatively limited number of levels of the graph in relation to a user-selected focus node.

FIG. 8 illustrates a fisheye view of the graph 700 illustrated in FIG. 7, from the focal point of a focus node, Node2 404. The parent nodes Root1 402 and Root2 502 form an inverted tree structure above Node2 404. It is from this inverted tree structure that a selected parent node, or "context" may be chosen. The prior art fisheye view illustrated in FIG. 8 is designed to show all parents and all children of the focus node. In practicality, the fisheye view does not provide for distinguishing among non-shared children of Node2 404 among the hierarchies represented by Root1 402 and Root2 502. The inventors have determined that many users find the fisheye view too complex. It is preferred that a user be given the option to view only those child nodes of the focus node 404 that are relevant to a particular parent node 402, 502 of interest.

FIGS. 9 and 10 illustrate fisheye views 900, 1000, respectively, wherein a distinction is made between the child nodes 408, 410 of Node2 404 that are relevant (otherwise referred to as "in context") to Root1 402 versus the child nodes 504, 506, 514 that are in context for Root2 502. This distinction is relevant to graphs having shared nodes but that do not share all (or any) nodes of the child sub-tree of the shared node. For a multitree, for instance, the sub-tree of a common node is fully shared among hierarchies, so there is no need for a distinction between child nodes. For a tree, the distinction in similarly meaningless, since a tree structure, by definition, does not allow more than one parent node (hence, no alternative contexts) for a particular node. Accordingly, graphs having a plurality of hierarchies that share a common node but do not share the entire child sub-tree of the common node present several challenges for content visualization. Such challenges are addressed by the navigation and manipulation interface described herein.

FIG. 11 illustrates that, without taking the presentation of only in-context children of a focus node into account, an interface implementing the traditional fisheye view presents all parents and all children of a focus node. This presentation is often unwieldy and overly inclusive for a typical user. Users often dislike the large scale of such an aggregate structure, and would prefer quick access to those parts of a large hierarchy that are of particular interest at a given time.

FIGS. 12, 13, and 14 illustrate a preferred approach that allows for display of only in-context children of a selected focus node, Node1 406. FIG. 12 illustrates that in-context children of Node1 406 in the context of Root1 402 include Child1d 416, Child1e 414, and Child1f 412. If, however, Root2 502 is the selected context for Node1 406 rather than Root1 402, FIG. 13 illustrates that the in-context children of Node1 406 include Child2d 506, child1b 508, Child1c 510, Child2d1 512, and Child1b1 516. In contrast, FIG. 14 illustrates that in-context children for Node1 406 in the context of Root3 602 include Child1g 604, Child1h 606, and Child1i 608.

In addition to determining that a fisheye view of in-context children is desirable in a hierarchy interface, the inventors have also determined that a traditional graphical representation of nodes connected by lines, as illustrated in FIGS. 1 and 3–14, is not practical for certain computing environments. Instead, a textual-format representation, similar to the one illustrated in FIG. 2, allows for faster processing in cases where generation of graphical objects, such as lines, require time-consuming processing, such as the loading of applets. The inventors have further determined that a textual-format interface is, in at least one embodiment, more useful if only one level of child nodes is displayed for a focus node.

FIG. 23 is a flowchart illustrating a method of providing an interface that allows a user to navigate and display data related to a graph, wherein the graph represents a plurality of hierarchies, where at least two of the hierarchies share a common node, but where the two hierarchies do not share, at least not completely, the exhaustive child sub-tree of the common node. In other words, FIG. 23 illustrates a method of implementing the interface approach discussed above in connection with FIGS. 12–14, where only one level of in-context children is displayed in connection with a focus node. FIG. 23 illustrates that for either a search or traversal approach, a focus node selection input is received from the user in operation 2304. Based on such input, the focus node is identified in operation 2306 and displayed in operation 2308. In operation 2310, the context of the focus node is determined. As is discussed in further detail below, the context for a focus node may be null, as in the case of a search or in the case of a top-down traversal of the root nodes of a hierarchy. In operation 2312, it is determined whether any next-level in-context children of the focus node exist. If so, they are displayed. In operation 2314, it is determined whether any parents of the focus node exist. If so, they are displayed. It should be noted that, in at least one embodiment, all parents of the focus node are displayed rather than simply the context node. At least one advantage of such an approach is that it facilitates bottom-up traversal through a parent node other than the context node. In operation 2316, it is determined whether the user has elected not to proceed, such as by activating a "cancel" object. If not, operation proceeds to operation 2304, in order to obtain the user's next focus node selection input.

FIGS. 15–25 illustrate a textual-format representation of a hierarchy interface. When viewed in conjunction with FIG. 26, such figures provide a framework for discussing a preferred embodiment of a method for navigating and displaying a plurality of relational objects. In the preferred embodiment, the relational objects represented on the interface comprise a plurality of hierarchies, wherein each of the hierarchies share a common node with at least one other of the hierarchies, and wherein the hierarchies that share a common node do not share the exhaustive child sub-tree of the common node. Hereinafter, such a plurality if hierarchies is sometimes referred to herein as a context-sensitive shared-node graph.

FIGS. 15 through 26 illustrate a detailed method 2300 of navigating and displaying a context-sensitive shared-node graph such as the graph illustrated in FIG. 7. A user may navigate a hierarchy using one of, or a combination of, the following approaches: top-down traversal, bottom-up traversal, and "find" mode.

FIGS. 7, 15 and 26A illustrate that, if a user elects the top-down traversal mode at the beginning 2602 of an interface session, then the search input evaluation in operation 2604 will evaluate to "no." In such case, because top-down traversal begins at the root-node level of the graph 700, the context is assigned to a null value in operation 2606. In operation 2608, the top nodes 402, 502, 602 of the context-sensitive shared-node graph 700 are displayed. In a preferred embodiment, the top nodes 402, 502, 602 are displayed in textual format. One skilled in the art will recognize that display of the top nodes could alternatively be in a non-textual format, such as a graphical format, although such display format may be less efficient than textual-format displays in some computing environments.

Operation continues at operation 2616, wherein a focus node selection input is received. Such an input may be received, for example, when the user double-clicks or otherwise selects a node from the root node display such as that illustrated in FIG. 15. In a preferred embodiment, a user can select Root2 502 from the display illustrated in FIG. 15 either by single-clicking to highlight Root2 502 (as shown) and selecting a "bring to focus" object 1502 and its associated functionality, or by double-clicking on the Root2 representation 502. Any other known selection mechanism may also be used. The action is interpreted as the selection of a focus node, and the input is received in operation 2616. Based on the focus node selection input, the focus node is identified in operation 2618.

FIGS. 16 and 26A illustrate that, in operation 2620, the selected focus node is displayed. FIG. 16 illustrates that, continuing the example of FIG. 15, the focus node Root2 502 selected in operation 2616 is displayed in a focus node display area 1602. In operation 2622 it is determined whether the context value is null. If so, no parent node for the focus node is currently identified. As a result, all children of the focus node are displayed in the child node display area 1606 because no in-context child-node calculation can be performed when the context value is null. Accordingly, FIG. 16 illustrates that, if the context evaluates to a null value in operation 2622, then all child nodes are displayed in the child node display area 1606 in operation 2624.

In operation 2630 the parent nodes of the focus node are determined and displayed. FIG. 26A illustrates that operation 2630 is performed regardless of the evaluation result in operation 2622. It will be recognized that, in some cases, there will be no parent nodes to be displayed. For instance, when no parent (or "context") is identified for the focus node in a top-down traversal, one can assume that the focus node is the root node and there are therefore no parents to display in the parent node display area 1604. Accordingly, FIG. 16 illustrates that, when no parent for the focus node is currently identified in a top-down traversal, no parent nodes are displayed in the parent node display area 1604. In a situation where no parent nodes are displayed in the parent node display area 1604, the evaluation in operation 2632 will always evaluate to "no." In such case, processing proceeds to operation 2638.

FIGS. 16 and 26B illustrate that, in operation 2638, it is determined whether a new focus node has been selected from the child nodes 404, 406 displayed in the child node display area 1606. Such a selection can be accomplished, for example, by highlighting the desired new focus node Node1 406 with a single-click, and then selecting the "bring to focus" option 1502. As discussed above, selection of a new focus node can also be accomplished, in a preferred embodiment, by double-clicking on the desired node 406. Selection of a new focus node may also be accomplished via any other known selection mechanism. The new focus node selection input, if generated, is received in operation 2638 and the evaluation results in a "yes" condition. Accordingly, operation 2644 is performed, wherein the context for the newly-selected focus node is set to the value of the current focus node. In other words, when the child of a focus node is selected as the new focus node, the context for the newly selected focus node is set to its parent that had previously been selected as the focus node. In operation 2645, the newly selected focus node is identified, based on the selection input received in operation 2638.

FIGS. 17 and 26A illustrate that processing then continues at operation 2620. During this second pass through operation 2620, the new focus node, Node1 406, is displayed in the focus node display area 1602.

In operation 2622, the context value is evaluated. For the example illustrated in FIGS. 15 through 17, this second pass through operation 2622 finds that the context for the current focus node, Node1 406, has been assigned to "Root2" [in the prior execution of operation 2644 as discussed above in connection with FIG. 26B]. Accordingly, the comparison operation 2622 evaluates to "no."

In at least one alternative embodiment, the user may elect to see all children of a focus node, even when the context determination described connection with the foregoing example would ordinarily be non-null. This is accomplished by permitting the user to select a "view all children" option (not shown), which results in resetting the context to a null value.

FIGS. 17 and 26A illustrate that, when the context is not a null value, a determination of the in-context child[ren] of the focus node 406 is performed in operation 2626. The child[ren], if any, are displayed in the child node display area 1606. For the example shown in FIG. 17, the child nodes 506, 508, and 510 are displayed in the child node display area 1606 as the result of operation 2628. One will note that, in a preferred embodiment, only one level, the next-lower level, of children in the hierarchy 500 are displayed in the child node display area 1606. This limited view facilitates a smaller, more easily-managed, content visualization interface than that provided by the fisheye view as illustrated in FIG. 3.

Because the context evaluation in operation 2622 evaluated to a non-null value, it is apparent that there exists at least one parent node of the focus node. In operation 2630 the parent nodes are determined and displayed. For the example illustrated in FIG. 17, the parent nodes root1 402 and root2 502 of focus node Node1 406 are displayed in the parent node display area 1604.

FIGS. 26A and 26B illustrate that, at this point in the operation of the navigation and display interface, the user may choose one of several options. The user may choose to discontinue navigation of the hierarchy. In such case, the user will not choose a new focus node, such that the evaluations in operations 2632 and 2638 will evaluate to "no." Similarly, the user will not enter a search input and, accordingly, the evaluation in operation 2640 will evaluate to "no." In such case, operation of the interface session terminates at operation 2642. For a discussion of continued operation from this point when a search input is entered, please see the following discussion of FIGS. 21 and 22.

FIG. 17 illustrates that, rather than choose to discontinue navigation of the hierarchy, a user may choose instead to select a new focus node. If parent nodes are displayed, as in FIG. 17, the user may select from among any of the displayed parent nodes 402, 502 as the new focus node. Alternatively, if child nodes are displayed, as in FIG. 17, the user may select from among any of the displayed child nodes 506, 508, 510 as the new focus node.

FIGS. 17, 26A and 26B illustrate that, in operation 2632, it is determined whether an input has been received to select one of the displayed parent node(s) as the new focus node. If not, then it is determined in operation 2638 whether a new focus node has been selected from the child node(s) displayed in the child node display area 1606. During this second pass through operation 2638 it is determined, using the example in FIG. 17, whether Child2d 506, Child1b 508, or Child1c 510, or none of them, have been selected.

FIG. 18 illustrates an exemplary display screen when Child2d 506 is selected from among the child nodes 506, 508, 510 displayed in the child node display area 1606 in FIG. 17. FIG. 18 illustrates that, in operation 2644, the context for the newly-selected focus node (Child2d 506) is set to the current focus node (Node1 406). In this manner, the context for a newly-chosen child focus node is set to that of its parent that was traversed in order the reach the newly-selected focus node. In operation 2645, the newly-selected child focus node (Child2d 506) is identified as the focus node.

FIGS. 18 and 26A illustrate that, when a displayed child node has been selected as the focus node, the newly selected node is assigned as the current focus node in operation 2636. Processing continues at operation 2620. During this third pass of operation 2620, the newly-selected focus node (Child2d 506) is displayed in the focus node display area 1602. In the example shown in FIG. 18, the context is non-null due to the previous execution of operation 2644, wherein the context for the newly-selected focus node (Child2d 506) was set to the then-current focus node (Node1 406). One will note that the context Node1 804 is displayed (in an operation not shown in FIG. 26) in a child-node context display area 1802.

Because the context is non-null, the third pass through operation 2622 evaluates to "no" and, accordingly, operations 2626 through 2630 are performed, as described above. For the example illustrated in FIG. 18, the in-context child, Child2d1 512, of the focus node (Child2d 506) is displayed in the child node display area 1606 in operation 2628. Similarly, the parent nodes (Node1 406, Node2 404) of the focus node (Child2d 506) are displayed in the parent node display area 1604 in operation 2630. If no new focus node is selected, then the evaluations at operations 2632 and 2638 evaluate to "no." If no search input is selected, then the session terminates at operation 2642.

FIGS. 17 and 24–26 illustrate processing during an interface session when the parent node of a current focus node is selected as the new focus node. Traversal from a focus node up to a parent node is referred to herein as bottom-up traversal. Rather than selecting the child 2d 506 as the new focus node (as discussed above in connection with operation 2638 and FIG. 17), FIG. 24 illustrates selection of a new focus node (Root1 402) from the parent node display area 1604 in operation 2632.

In operation 2633, the focus node is identified based on the input received in operation 2632. In operation 2633, the context of the newly-selected focus node (Root1 402) is determined. For instance, in the example illustrated in FIG. 24, the context of Root1 402 is determined as null because Root1 402 is a root node having no parents. Accordingly, the context value is set to null in operation 2634. In operation 2636, the newly-selected focus node is assigned as the current focus node.

FIGS. 25 and 26A illustrate that, in operation 2620, the current focus node (Root1 402) is displayed in the focus node display area 1602. In operation 2622, the context is evaluated. Processing continues, as described above, depending on the result of the context evaluation 2622. For the example illustrated in FIG. 25, the context is null because the focus node (Root1 402) is a root node. In such case, because the null-context evaluation 2622 evaluates to "yes" for the example illustrated in FIG. 25, all child nodes (Node1 406, Node2 404) of the focus node (Root1 402) are displayed in the child node display area 1606 during operation 2624. Similarly, no parent nodes are displayed in the parent node display area 1604 in operation 2630. Because no parent nodes are displayed, the evaluation in operation 2632 will evaluate to "no." If no new focus node is selected from the displayed child nodes (Node 1 406, Node2 404), then the evaluation at operation 2638 evaluates to "no." If no search input is selected, then the session terminates at operation 2642. Otherwise, if a child node is selected as the new focus node in operation 2638, then operation continues as described above.

FIGS. 19–23 and 26 illustrate that a user may choose to navigate the graph 700 via a "find" function in conjunction with, or instead of, a top-down or bottom-down traversal. FIGS. 19 and 20 illustrate a method of displaying and navigating a context-sensitive shared-node graph 700 via a "find" function rather than top-down traversal of the root nodes. FIG. 19 illustrates that a "find" object 1902 is displayed to the user. One skilled in the art will recognize that any manner of providing the user the option of using a "find" feature is contemplated, including presenting a text inquiry such as "do you wish to perform a search?" In a preferred embodiment, the user indicates a wish to perform a search by activating the find object 1902 (such as, for instance, clicking on the object 1902). In operation 2604, the search input by activating the find object 1902 is received and the decision box 2604 evaluates to "yes." If no such input has been received in operation 2604, then the decision box 2604 evaluations to "no."

FIGS. 20 and 26A illustrate that, if the decision box 2604 evaluates to "yes", operation 2609 is performed. In operation 2609, search criteria are obtained from the user. For instance, FIG. 20 illustrates that a search criteria input area 2002 is displayed to the user. The user can input a desired value 2004 for a desired field 2006 that is contained within the relational objects of the graph 700. One of skill in the art will recognize that search criteria can include any field or relationship included within a relational object, such as name, hierarchy, start date, ID, "child of", etc. A relationship field 2008 further defines the relationship between the field 2006 and the desired value 2004. For instance, the relationship field 2008 may provide for input of parameters such as "contains", "begins with", "does not contain", etc.

In operation 2610, the context is assigned to a null value. Such operation is performed because, when a focus node having multiple parents is identified via a search, the desired context is not discernable. In an alternative embodiment, the context of the focus node can be identified as part of the search criteria received in operation 2609. In such case, rather assigning the context to a null value in operation 2610, the context is assigned to the context provided by the user as a search criterion in operation 2609.

In operation 2612, the search is performed. In a preferred embodiment, execution of operation 2612 is triggered by receipt of an "apply" input. FIG. 20 illustrates that the "apply" input is provided by activation of an apply object 2010. FIG. 20 further illustrates that the search results are displayed, in operation 2614, in a search result display area 2012. In operation 2626, the user may select a focus object from among the search results displayed in the search result display area 2012. If the user makes such a selection, then processing continues with operation 2618 as discussed above. Instead of so proceeding, the user may elect to cancel the search function by activating a "cancel" object 2014. (Indeed, operation of the search function may be so cancelled at any point during search processing.) Alternatively, the user may elect to reset the search parameters by activating the "reset" object 2016. In such case, the user is free to initiate another search with revised parameters.

FIGS. 21, 22, and 26B illustrate a method of displaying and navigating a context-sensitive shared-node graph 700 via a "find" function in conjunction with traversal of the graph nodes. FIG. 21 illustrates a display of child nodes (Child2d 506, Child1b 508, Child1c 510) of a focus node (Node1 406) in the context of Root2 502. FIG. 21 illustrates that the "find" object 1902 is displayed to the user in conjunction with a display generated during a top-down traversal. (Processing related to top-down traversal resulting in such display is discussed above in connection with FIG. 17). If the user elects, by activating the find object 1902 on a display generated during a traversal, to perform a search, then such input is received in operation 2640. In such case, processing continues at operation 2609.

FIG. 22 illustrates that, in response to receipt of the search input in operation 2604, search criteria are obtained from the user in operation 2609. Search processing continues in operations 2610, 2612, and 2614 as described above in connection with FIG. 20. That is, a search criteria input area 2002 is displayed to the user in operation 2609 and search criteria are obtained from the user. In operations 2612 and 2614, respectively, the search is performed and the search results are displayed to the user in the search result display area 2012. In operation 2610, the context is assigned to a null value because, when a focus node having multiple parents is identified via a search, the desired context is not discernable. In an alternative embodiment, the context of the focus node can be identified as part of the search criteria received in operation 2609. In such case, rather assigning the context to a null value in operation 2610, the context is assigned to the context provided by the user as a search criterion in operation 2609.

FIG. 27 illustrates an alternative embodiment of a search criteria input area 2002. In the embodiment of a search interface illustrated in FIG. 23, various search display objects 2302, 2304, 2306, 2308, 2310 indicate different types of searches that may be performed on a context-sensitive shared-node graph 700 (FIG. 7) in order to locate a potential focus node. FIG. 23 illustrates that the search display objects 2302, 2304, 2306, 2308, 2310 provide for searches of nodes based on the value of various attribute fields, including party name, hierarchy type, hierarchy name, etc. From a comparison of FIGS. 21 and 22 with FIG. 23, one skilled in the art can see that many options and permutations are possible in terms of displaying a search criteria input area 2002 and search result display area 2012. All such options and permutations are contemplated by the interface and method described herein.

FIG. 28 illustrates a display that not only indicates that a node may be a member of more than one hierarchy, but also so indicates via a visual differentiation technique such as italics font. One skilled in the art will recognize that any visual differentiation technique may be utilized, including icons, bold font, etc. The visual differentiation display illustrated in FIG. 28 is useful in a hierarchy wherein there is a priority for objects belonging to more than one hierarchy in order to indicate which hierarchy is the preferred, or primary, hierarchy for a multi-hierarchy object (i.e., a "shared" node). For example, in FIG. 28 various in-context child nodes are displayed for the focus node, "Michael Bean." Two of those in-focus child nodes include "Jane Michael Bean" 2802 and "Sweetpea Bean" 2804. Both nodes 2802 and 2804 are visually differentiated (in this case, italicized) to indicate that their primary hierarchy is a hierarchy other than the chosen context hierarchy (in this case, "Sample Organization Hierarchy"). The display in FIG. 28 illustrates that the primary hierarchy for "Jane Michael Bean" 2802 is the "East County Insurance" hierarchy while the primary hierarchy for "Sweetpea Bean" 28043 is the "Whole County Insurance" hierarchy.

FIG. 29 illustrates an exemplary general-purpose computer 2900 on which at least one embodiment of the present invention can be implemented. Input user device(s) 2910, such as a keyboard and/or mouse, are coupled to a bi-directional system bus 2918. The input user device(s) 2910 are for introducing user input to the computer system and communicating that user input to processor 2913. The computer system of FIG. 29 also includes a video memory 2914, main memory 2915 and mass storage 2929, all coupled to bi-directional system bus 2918 along with input user device(s) 2910 and processor 2913. The mass storage 2929 may include both fixed and removable media, such as other available mass storage technology. Bus 2918 may contain, for example, 32 address lines for addressing video memory 2914 or main memory 2915. The system bus 2918 also includes, for example, a 32-bit DATA bus for transferring DATA between and among the components, such as CPU 2929, main memory 2915, video memory 2914 and mass storage 2929. Alternatively, multiplex DATA/address lines may be used instead of separate DATA and address lines.

Computer programs and data are generally stored as instructions and data in mass storage 2929 until loaded into main memory 2915 for execution. Computer programs may also be in the form of electronic signals modulated in accordance with the computer program and data communication technology when transferred via a network. The method and functions relating to at least one embodiment the system and method for providing the user interface described herein may be implemented in a computer program. Furthermore, context subsystem data structures can be implemented in CPU 2900 and utilized by CPU 2900 or by other data processing systems that have access to the data structures.

For at least one embodiment wherein the method and system for providing an interface are implemented in software, such embodiment includes a computer-readable medium having a computer program accessible therefrom, the computer program including instructions for performing the method of providing an interface. The computer-readable medium includes any of the following: a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

In the preferred embodiment of this invention, the processor 2913 is a 32-bit microprocessor manufactured by Motorola, such as the 680X0 processor or microprocessor manufactured by Intel, such as the 80X86, or Pentium processor. However, any other suitable microprocessor or microcomputer may be utilized. Main memory 2915 is comprised of dynamic random access memory (DRAM). Video memory 2914 is a dual-ported video random access memory. One port of the video memory 2914 is coupled to video amplifier 2916. The video amplifier 2916 is used to drive the display 2917. Video amplifier 2916 is well known in the art and may be implemented by any suitable means. This circuitry converts pixel DATA stored in video memory 2914 to a raster signal suitable for use by display 2917. In at least one embodiment, display 2917 is a type of monitor suitable for displaying graphic images. In other embodiments, display 2917 may any other type of known display medium, including the screen of a personal digital assistant, a projection screen, and the like.

The computer system described above is for purposes of example only. The interface described herein may be implemented in any type of computer system or programming or processing environment. It is contemplated that at least one embodiment of the interface described herein will be run on a stand-alone computer system, such as the one described above. At least one embodiment of the interface described herein can also be implemented from a server system that can be accessed by a plurality of client computer systems interconnected over an intranet network. Finally, at least one embodiment of the interface described herein may be run from a server that is accessible to clients over the Internet.

FIG. 30 illustrates a network system in which at least one embodiment of the present invention may be implemented. FIG. 30 shows a data processing system 3002 having components interacting over a computer network 3010 such as the Internet. The server computer 3000 is shown connected to the computer network 3010 via pathway 3005. Pathway 3005 may be any of a variety of connections to computer network 3010. Pathway 3005 can utilize the public switched telephone network in order to transmit signals from server computer 3000 to computer network 3010. Access to the Internet can also be provided by higher speed ISDN lines, cable modems, dedicated T1 lines, or any number of other conduits. Data processing system 3002 can also be implemented on a local area computer network, or LAN, which is sometimes referred to as an "intranet" as opposed to the Internet. In a LAN environment, pathway 3005 could be implemented using Ethernet wiring, token-ring wiring, or other types of local area network conduits. While the data processing system 3002 can be implemented on a LAN, computer network 3010 may often be the Internet because the Internet allows users outside the LAN to communicate with server computer 3000. In addition, the "thin" client-side aspect of data processing system 3002 allows for standard Internet browsers, such as Netscape's Navigator product or Microsoft's Internet Explorer product, to provide interactive data-bound controls without the user having to install software, often called "plug-ins," on the client computer system. Depending on the size of the organization using server computer 3000 to connect to the Internet, the pathway 3005 to reach the Internet may include an Internet Service Provider, or "ISP." A smaller organization may not have a direct connection to the Internet and, so, may rely upon an ISP to provide access to the Internet. In such case, the ISP would be part of pathway 3005 used by server computer 3000 to connect to the Internet 3010. In larger organizations, a direct link to the Internet 3010 may exist, bypassing the need for an ISP to provide such connection capabilities.

Interactive data-bound controls are related to data 3025. Data 3025 is often organized in a database management system (DBMS) that provides sophisticated access and editing capabilities. Examples of database management systems include Microsoft Access database, the Oracle database, IBM's DB2 and IMS, and Microsoft's SQL Server. Databases attached to server computer 3000 may be implemented on a mainframe computer system, personal computer (i.e., based on the Intel x86 instruction set or on the Apple MacIntosh), or on a midrange computer system. In addition, data 3025 may be stored in a "flat file" (i.e., stored in computer files but not in a database management system). Data 3025 is connected to server computer 3000 in one of several ways. Faster access to data 3025 may result by storing data 3025 in nonvolatile storage (i.e. a hard drive, etc.) directly coupled to server computer 3000. However, for larger, shared databases, data 3025 may be stored on a separate computer system that may be dedicated to the database application and providing data over a communication line, such as a LAN, in response to requests received from server computer 3000.

In addition to server computer 3000, client computer systems 3020 and 3021 are also shown connected to computer network 3010. FIG. 30 depicts two client computer systems but any number of client computer systems may be connected to computer network 3010 and communicate with server computer 3000. Each client computer system is connected to computer network 3010 via a pathway. Client computer system 3020 connects to computer network 3010 via pathway 3030. Pathway 3030 used by client computer system 3020 may vary as described with respect to pathway 3005 used to connect the server computer system 3000 to computer network 3010. The interactive data-bound control 3050 is displayed to the user on computer monitor 3040. The interactive data-bound control 3050 can represent any display of data, and the representation interactive data-bound control 3050 is only one embodiment of such representation. Other example embodiments are set forth below. Pointing device 3060, such as a mouse, trackball, graphics pad, directional keyboard keys, or the like, is used by the user to select and manipulate interactive data-bound control 3050. The second client computer system 3021 is connected to computer network 3010 via pathway 3031 as discussed for computer system 3020 and pathway 3030. Likewise, interactive data-bound control 3051 is displayed to the second user on computer monitor 3041 as discussed for interactive data-bound control 3050 and monitor 3040. Finally, pointing device 3061 is used to select or manipulate interactive data-bound control 3051 as described for pointing device 3060 and interactive data-bound control 3050. Any number of client computer systems can be connected to computer network 3010. Each of these client computer systems would include monitors and pointing devices to display and manipulate interactive data-bound controls.

Other Embodiments

The foregoing description utilizes certain examples that are provided for clarity only, and should not be taken to be limiting. For example, while many of the linked-node examples discussed above indicate, for simplicity's sake, that the focus node is only one level away from the root node, one of skill in the art will appreciate that the interface system and method described herein may be implemented for a hierarchical data structure having any number of levels.

Other embodiments are within the scope of the following claims. For example, additional navigation and data manipulation features are encompassed by the claims. For instance, FIG. 31 illustrates that the alternative search criteria input area 2002 discussed in connection with FIG. 27 further provides for locating a node based on its position within a hierarchy. In addition, a node may be located within a hierarchy based on one, or a combination of, the hierarchy type, hierarchy type, and hierarchy id as well as position, and party name, party id, and party start and end dates. In addition, a node may be located within a hierarchy based on whether it is a "linked position." A linked position indicates that the hierarchy being searched is not a the primary hierarchy for the linked node. A user may "sidle" to a linked hierarchy. In so doing, the context of a linked node can be changed to its primary hierarchy.

Also for example, FIG. 32 illustrates that the results of a search and the nodes listed in a child node display area or parent node display area may be sorted on different fields. A user may select such sort features from among a set of offered "display options" 3202. For instance, the hierarchy may viewed as sorted by titles or people. FIG. 33 is a screen shot illustrating a display generated as a result of a user's selection of the view-by-title display option 3202.

Also for example, other data manipulation and display options are contemplated by the interface described herein. Screen shots illustrating addition of a position or party are set forth in FIGS. 34*a* and 34*b*. Screen shots relating to editing a position or party, retiring a party, and moving a sub-tree are illustrated in FIGS. 35, 36, and 37, respectively.

Those of skill in the art will recognize that regardless of whether the interface described herein is performed by software resident on a user's local work-station or resident on a network server, and regardless of whether the relational objects forming the graph are maintained on a user's local workstation or on a network server, the interface makes it significantly easier on the user to navigate, view, and manipulate hierarchical data. The user need only view at one time, at most, a focus node, one level of parent nodes, and one level of in-context child nodes of the focus node. Accordingly, the user is able easily view an abbreviated fisheye view of the focus node of interest, and a relatively small number of related nodes. The user further benefits from viewing, in at least one embodiment, a textual representation of the data, which is easy-to-read and does not require the additional processing time associated with applets or other time-consuming manners of reproducing graphical nodes and lines on a display. By presenting only in-context child nodes of a focus node, the interface accommodates a graph structure wherein, among a plurality of graphs, at least one graph shares a common node with a second graph, but the first and second graph do not fully share the exhaustive child sub-tree of the common node.

The above embodiments illustrate but do not limit the invention. In particular, the invention is neither limited by the types of computers used as workstations or servers, nor the operating systems, web server or database management application software run on such workstations and/or servers. The invention is not limited to implementation within extranets or other Internet applications, but may be implemented over private networks exploring proprietary display and transmission formats. The invention is limited neither by the types of user terminals used to connect to the servers, nor the type of browser software resident on the terminals. The invention is not limited by the mechanism used to store the hierarchical data, nor is it limited by the nomenclature used in identifying data types and attributes. Moreover, the invention is not limited by the characteristics of the GUI embodiments disclosed herein.

In addition, while the invention is illustrated in the disclosed embodiments as providing an interface that allows a user to navigate, view, and manipulate hierarchical data relevant to organizations and families, those of ordinary skill in the art will recognized that it may also be used, for example, to represent hierarchies of any type, including hierarchies of inanimate objects, animals, and the like.

Finally, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. Other embodiments and variations are within the scope of the invention, as defined by the appended claims. Other embodiments and variations are within the scope of the invention, as defined by the appended claims.

What is claimed is:

1. A method for navigating and displaying a plurality of relational objects, the method comprising:
   receiving a selection input;
   identifying, based on the selection input, a focus node, the focus node being one of a plurality of relational objects, wherein:
      the plurality of relational objects comprise a node link structure;
      the node link structure further comprising a plurality of hierarchies of nodes;
      a first of the plurality of hierarchies shares the focus node with a second of the plurality of hierarchies;
      the focus node has a first parent node in the first hierarchy and a second parent node in the second hierarchy;
      the focus node is a parent node for a first child sub-tree of one or more nodes in the first hierarchy and is a parent node for a second child sub-tree of one or more nodes in the second hierarchy;
      the first hierarchy does not include the second child sub-tree of one or more nodes; and
      the second hierarchy does not include the first child sub-tree of one or more nodes;
   displaying the focus node on a display medium;
   determining a context for the focus node, wherein determining a context for the focus node includes receiving a selection identifying one of the first and second parent nodes and the context identifies the hierarchy containing the parent node identified by the received selection; and
   displaying the parent node and at least one child sub-tree from the hierarchy identified by the determined context without displaying the parent node and child sub-tree in the hierarchy not identified by the determined context.

2. The method recited in claim 1, wherein displaying the focus node further comprises displaying the focus node in a textual format, wherein the textual format is a format other than a format that illustrates the focus object and the first related object as nodes connected by a graphical relationship symbol such as a line or arrow.

3. The method recited in claim 1, further comprising:
displaying as a top grouping a subset of the plurality of relational objects; and
wherein receiving a selection input further comprises receiving a selection input that corresponds to a selected one of the relational objects in the top grouping.

4. The method recited in claim 1, further comprising:
receiving a find input;
performing a search of the plurality of relational objects in order to determine whether one or more of the relational objects is associated with the find input; and
if one or more of the relational objects is associated with the find input, displaying as a find grouping the one or more relational objects associated with the find input.

5. The method recited in claim 4, wherein:
the selection input identifies one of the relational objects in the find grouping.

6. The method recited in claim 1, wherein:
one or more of the plurality of relational objects represents a person.

7. The method of claim 1 wherein determining a context of the focus node comprises:
determining a context of the focus node based on the selection input.

8. A method of using a computer system for navigating and displaying a plurality of nodes, the method comprising:
receiving data;
identifying, based on the received data, a focus node, wherein:
the focus node is one of the plurality of nodes and is a common node of a first hierarchy of nodes and a second hierarchy of nodes;
the plurality of nodes are included in a node link structure;
the plurality of nodes include the first hierarchy of nodes and the second hierarchy of nodes;
the focus node has a first parent node in the first hierarchy of nodes and has a second parent node in the second hierarchy of nodes;
the focus node is a parent node for a first child sub-tree of one or more nodes in the first hierarchy and is a parent node for a second child sub-tree of one or more nodes in the second hierarchy;
the first hierarchy does not include the second child sub-tree of one or more nodes; and
the second hierarchy does not include the first child sub-tree of one or more nodes;
receiving data identifying one of the first and second parent nodes as a context of the focus node, wherein the context is associated with the hierarchy containing the identified parent node; and
providing data to a client computer system for displaying the focus node and the one or more nodes of the child sub-tree of the hierarchy of nodes determined to be associated with the context of the focus node without displaying the child sub-tree of the hierarchy of nodes that are not determined to be associated with the context of the focus node.

9. The method recited in claim 8 further comprising:
providing data to allow the display medium to display the parent node of the focus node in the hierarchy of nodes determined to be associated with the context of the focus node.

10. The method recited in claim 8 wherein the context of the focus node is associated with the first hierarchy of nodes.

11. The method recited in claim 8 further comprising:
identifying the first and second hierarchies of nodes;
identifying the first and second parent nodes; and
identifying the first and second child sub-trees of nodes.

12. The method recited in claim 8 wherein determining a context of the focus node comprises:
receiving data identifying one of the first parent node and the second parent node, wherein if the first parent node is identified, the context is associated with the first hierarchy of nodes and if the second parent node is identified, the context is associated with the second hierarchy of nodes.

13. The method recited in claim 8 wherein identifying a context of the focus node comprises:
identifying a context of the focus node based on the received data.

14. A method of using a computer system for navigating and displaying a plurality of nodes, the method comprising:
providing data that identifies a focus node, wherein:
the focus node is one of the plurality of nodes and is a common node of a first hierarchy of nodes and a second hierarchy of nodes;
the plurality of nodes are included in a node link structure;
the plurality of nodes include the first hierarchy of nodes and the second hierarchy of nodes;
the focus node has a first parent node in the first hierarchy of nodes and has a second parent node in the second hierarchy of nodes;
the focus node is a parent node for a first child sub-tree of one or more nodes in the first hierarchy and is a parent node for a second child sub-tree of one or more nodes in the second hierarchy; and
the first hierarchy does not include the second child sub-tree of one or more nodes; and
the second hierarchy does not include the first child sub-tree of one or more nodes;
providing data that identifies one of the first and second parent nodes as a context of the focus node, wherein the context is associated with the hierarchy containing the identified parent node; and
displaying, on a display medium, the focus node and the one or more nodes of the child sub-tree of the hierarchy of nodes determined to be associated with the context of the focus node without displaying the child sub-tree of the hierarchy of nodes that are not determined to be associated with the context of the focus node.

15. The method recited in claim 14 further comprising:
displaying on a display medium the parent node of the focus node in the hierarchy of nodes determined to be associated with the context of the focus node.

16. The method recited in claim 14 wherein the context of the focus node is associated with the first hierarchy of nodes.

17. The method recited in claim 14 further comprising:
providing data to identify the first and second hierarchies of nodes;
providing data to identify the first and second parent nodes; and
providing data to identify the first and second child sub-trees of nodes.

18. The method recited in claim 14 wherein determining a context of the focus node comprises:
providing data identifying one of the first parent node and the second parent node, wherein if the first parent node is identified, the context is associated with the first hierarchy of nodes and if the second parent node is identified, the context is associated with the second hierarchy of nodes.

19. The method recited in claim 14 wherein identifying a context of the focus node comprises:
providing data identifying a context of the focus node.

20. A computer readable storage medium comprising processor executable code for:
identifying, based on received data, a focus node, wherein:
the focus node is one of a plurality of nodes and is a common node of a first hierarchy of nodes and a second hierarchy of nodes;
the plurality of nodes are included in a node link structure;
the plurality of nodes include the first hierarchy of nodes and the second hierarchy of nodes;
the focus node has a first parent node in the first hierarchy of nodes and has a second parent node in the second hierarchy of nodes;
the focus node is a parent node for a first child sub-tree of one or more nodes in the first hierarchy and is a parent node for a second child sub-tree of one or more nodes in the second hierarchy;
the first hierarchy does not include the second child sub-tree of one or more nodes; and
the second hierarchy does not include the first child sub-tree of one or more nodes;
receiving data identifying one of the first and second parent nodes as a context of the focus node, wherein the context is associated with the hierarchy containing the identified parent node; and
providing data to a client computer system for displaying the focus node and the one or more nodes of the child sub-tree of the hierarchy of nodes determined to be associated with the context of the focus node without displaying the child sub-tree of the hierarchy of nodes that are not determined to be associated with the context of the focus node.

21. The computer readable storage medium recited in claim 20 further comprising processor executable code for:
providing data to allow the display medium to display the parent node of the focus node in the hierarchy of nodes determined to be associated with the context of the focus node.

22. The computer readable storage medium recited in claim 20 wherein the context of the focus node is associated with the first hierarchy of nodes.

23. The computer readable storage medium recited in claim 20 further comprising processor executable code for:
identifying the first and second hierarchies of nodes;
identifying the first and second parent nodes; and
identifying the first and second child sub-trees of nodes.

24. The computer readable storage medium recited in claim 20 wherein the code for determining a context of the focus node further comprises processor executable code for:
receiving data identifying one of the first parent node and the second parent node, wherein if the first parent node is identified, the context is associated with the first hierarchy of nodes and if the second parent node is identified, the context is associated with the second hierarchy of nodes.

25. The computer readable storage medium recited in claim 20 wherein the code for identifying a context of the focus node further comprises processor executable code for:
identifying a context of the focus node based on the received data.

26. A computer system comprising:
a processor, and
a memory coupled to the processor, the memory comprising processor executable code for:
identifying, based on received data, a focus node, wherein:
the focus node is one of a plurality of nodes and is a common node of a first hierarchy of nodes and a second hierarchy of nodes;
the plurality of nodes are included in a node link structure;
the plurality of nodes include the first hierarchy of nodes and the second hierarchy of nodes;
the focus node has a first parent node in the first hierarchy of nodes and has a second parent node in the second hierarchy of nodes;
the focus node is a parent node for a first child sub-tree of one or more nodes in the first hierarchy and is a parent node for a second child sub-tree of one or more nodes in the second hierarchy;
the first hierarchy does not include the second child sub-tree of one or more nodes; and
the second hierarchy does not include the first child sub-tree of one or more nodes;
receiving data identifying one of the first and second parent nodes as a context of the focus node, wherein the context is associated with the hierarchy containing the identified parent node; and
providing data to a client computer system for displaying the focus node and the one or more nodes of the child sub-tree of the hierarchy of nodes determined to be associated with the context of the focus node without displaying the child sub-tree of the hierarchy of nodes that are not determined to be associated with the context of the focus node.

27. The computer system recited in claim 26 further comprising processor executable code for:
providing data to allow the display medium to display the parent node of the focus node in the hierarchy of nodes determined to be associated with the context of the focus node.

28. The computer system recited in claim 26 wherein the context of the focus node is associated with the first hierarchy of nodes.

29. The computer system recited in claim 26 further comprising processor executable code for:
identifying the first and second hierarchies of nodes;
identifying the first and second parent nodes; and
identifying the first and second child sub-trees of nodes.

30. The computer system recited in claim 26 wherein the code for determining a context of the focus node further comprises processor executable code for:
receiving data identifying one of the first parent node and the second parent node, wherein if the first parent node is identified, the context is associated with the first hierarchy of nodes and if the second parent node is identified, the context is associated with the second hierarchy of nodes.

31. The computer system recited in claim 26 wherein the code for identifying a context of the focus node further comprises processor executable code for:

identifying a context of the focus node based on the received data.

32. A computer system comprising:

means for identifying, based on received data, a focus node, wherein:

- the focus node is one of a plurality of nodes and is a common node of a first hierarchy of nodes and a second hierarchy of nodes;
- the plurality of nodes are included in a node link structure;
- the plurality of nodes include the first hierarchy of nodes and the second hierarchy of nodes;
- the focus node has a first parent node in the first hierarchy of nodes and has a second parent node in the second hierarchy of nodes;
- the focus node is a parent node for a first child sub-tree of one or more nodes in the first hierarchy and is a parent node for a second child sub-tree of one or more nodes in the second hierarchy;
- the first hierarchy does not include the second child sub-tree of one or more nodes; and
- the second hierarchy does not include the first child sub-tree of one or more nodes;

means for receiving data identifying one of the first and second parent nodes as a context of the focus node, wherein the context is associated with the hierarchy containing the identified parent node; and means for providing data to a client computer system for displaying the focus node and the one or more nodes of the child sub-tree of the hierarchy of nodes determined to be associated with the context of the focus node without displaying the child sub-tree of the hierarchy of nodes that are not determined to be associated with the context of the focus node.

\* \* \* \* \*